US012595017B2

(12) United States Patent

Hu et al.

(10) Patent No.: US 12,595,017 B2
(45) Date of Patent: Apr. 7, 2026

(54) ELECTRIC OFF-ROAD VEHICLE

(71) Applicant: Zhejiang CFMOTO Power Co., Ltd., Hangzhou (CN)

(72) Inventors: Xiayang Hu, Hangzhou (CN); Changjiang Li, Hangzhou (CN); Yunqiang Huang, Hangzhou (CN); Fuying Cheng, Hangzhou (CN); Jiahui Hou, Hangzhou (CN)

(73) Assignee: Zhejiang CFMOTO Power Co., Ltd., Hangzhou (CN)

( * ) Notice: Subject to any disclaimer, the term of this patent is extended or adjusted under 35 U.S.C. 154(b) by 467 days.

(21) Appl. No.: 18/090,124

(22) Filed: Dec. 28, 2022

(65) Prior Publication Data

US 2023/0234664 A1 Jul. 27, 2023

(30) Foreign Application Priority Data

Jan. 25, 2022 (CN) ......................... 202210165678.X

(51) Int. Cl.
| | |
|---|---|
| *B62J 43/16* | (2020.01) |
| *B60K 1/04* | (2019.01) |
| *B60K 17/16* | (2006.01) |
| *B60K 17/22* | (2006.01) |
| *B60K 17/354* | (2006.01) |
| *B60K 17/356* | (2006.01) |
| *B60L 50/60* | (2019.01) |

(Continued)

(52) U.S. Cl.
CPC .................. *B62K 5/01* (2013.01); *B60K 1/04* (2013.01); *B60K 17/16* (2013.01); *B60K 17/22* (2013.01); *B60K 17/354* (2013.01); *B60K 17/356* (2013.01); *B60L 50/64* (2019.02);

*B60L 50/66* (2019.02); *B62J 43/16* (2020.02); *B60K 2001/0422* (2013.01); *B60K 17/04* (2013.01); *B62K 2204/00* (2013.01)

(58) Field of Classification Search
CPC ............... B62K 5/01; B60K 1/04; B60K 1/00
See application file for complete search history.

(56) References Cited

U.S. PATENT DOCUMENTS

| | | | | |
|---|---|---|---|---|
| 2,228,581 A | * | 1/1941 | Olen .................... | B60K 17/346 |
| | | | | 180/250 |
| 6,605,018 B2 | * | 8/2003 | Palazzolo ............ | B60K 17/344 |
| | | | | 475/222 |

(Continued)

FOREIGN PATENT DOCUMENTS

| | | |
|---|---|---|
| CN | 103625277 A | 3/2014 |
| CN | 105000096 A | 10/2015 |

(Continued)

*Primary Examiner* — Steve Clemmons
(74) *Attorney, Agent, or Firm* — Shewchuk IP Services, LLC; Jeffrey D. Shewchuk

(57) ABSTRACT

An electric off-road vehicle includes a drive assembly including an electric motor; wheels including front wheels and rear wheels; a frame assembly on which the electric motor arranged; a battery pack providing electric energy for the electric motor; and a drive train including a drive axle assembly and a drive shaft. The drive shaft is connected between the electric motor and the drive axle assembly. The electric motor transmits a torque to at least part of the drive axle assembly through the drive shaft, and the drive shaft is positioned below the battery pack.

20 Claims, 19 Drawing Sheets

(51) Int. Cl.

| | |
|---|---|
| *B60L 50/64* | (2019.01) |
| *B62K 5/01* | (2013.01) |
| *B60K 17/04* | (2006.01) |

(56) References Cited

U.S. PATENT DOCUMENTS

| | | | | |
|---|---|---|---|---|
| 7,207,409 | B2 * | 4/2007 | Downs | B60K 17/3467 |
| | | | | 180/233 |
| 7,255,191 | B2 * | 8/2007 | Baldwin | B62K 11/10 |
| | | | | 180/312 |
| 8,312,954 | B2 * | 11/2012 | Johnson | B60L 50/66 |
| | | | | 280/281.1 |
| 8,789,640 | B2 * | 7/2014 | Matsuda | B62J 43/16 |
| | | | | 180/68.5 |
| 9,139,074 | B2 * | 9/2015 | Jarocki | B60L 50/64 |
| 9,156,342 | B2 * | 10/2015 | Annaberger | B60K 1/04 |
| 9,873,316 | B2 | 1/2018 | Lovold et al. | |
| 9,963,168 | B2 | 5/2018 | Suzuki | |
| 10,173,512 | B1 * | 1/2019 | Huang | B60L 50/66 |
| 10,214,100 | B2 * | 2/2019 | Ajisaka | B60K 15/04 |
| 10,336,370 | B1 * | 7/2019 | Lowery, Jr. | B62D 21/02 |
| 10,710,635 | B2 * | 7/2020 | Lowery, Jr. | B60K 1/04 |
| 10,830,326 | B2 * | 11/2020 | Kuang | F16H 48/24 |
| 11,358,633 | B2 | 6/2022 | Davies et al. | |
| 12,214,664 | B2 * | 2/2025 | Ripley | B60K 17/344 |
| 2004/0084239 | A1 | 5/2004 | Hioki | |
| 2005/0224262 | A1 | 10/2005 | Ima et al. | |
| 2006/0207823 | A1 | 9/2006 | Okada et al. | |
| 2010/0194086 | A1 | 8/2010 | Yamamura et al. | |
| 2010/0314182 | A1 * | 12/2010 | Crain | B60K 17/346 |
| | | | | 320/109 |
| 2021/0354539 | A1 * | 11/2021 | Miao | H02K 9/02 |
| 2023/0093742 | A1 * | 3/2023 | Rubanovich | B62J 43/10 |
| | | | | 180/233 |
| 2023/0192216 | A1 * | 6/2023 | Osawa | B60K 1/00 |
| | | | | 180/291 |

FOREIGN PATENT DOCUMENTS

| | | | |
|---|---|---|---|
| CN | 208664935 | U | 3/2019 |
| CN | 211364241 | U | 8/2020 |
| CN | 214776329 | U | 11/2021 |
| CN | 218229275 | U | 1/2023 |
| CN | 218229274 | U | 6/2023 |
| JP | 2012046077 | A | 3/2012 |

* cited by examiner

ELECTRIC OFF-ROAD VEHICLE

RELATED APPLICATION INFORMATION

The present application claims the benefits of priority to Chinese Patent Application No. 202210165678.X, filed with the Chinese Patent Office on Jan. 25, 2022. The entire contents of the above-referenced applications are incorporated herein by reference.

FIELD OF THE DISCLOSURE

The disclosure relates to an electric off-road vehicle.

BACKGROUND OF THE DISCLOSURE

Off-road vehicles are designed for use on various types of rough terrain, rather than just on pavement, such as desert and mountain forests. Four wheeled off-road vehicles with excellent grip over the ground surface have a broad market appeal due to their multi-purpose utility, simple structure and entertainment performance.

The use of an electric energy source for off-road vehicles has become an irresistible development trend for energy conservation and emission reduction. Electric off-road vehicles need to be equipped with a battery pack to store electric energy while carrying motors, drive systems and transmission systems. An electric off-road vehicle with longer range of travel on a single charge needs a battery pack with larger volume and weight. The position and method for arranging the battery pack on the electric off-road vehicle greatly affects the driving performance and handling performance. There is a need for providing an electric off-road vehicle with reasonable battery pack arrangement and good driving and handling performance.

SUMMARY OF THE DISCLOSURE

The object of the disclosure is to provide an electric off-road vehicle with stable and comfortable operation while satisfying the requirement of entertainment and off-road performance.

The disclosure provides an electric off-road vehicle. The electric off-road vehicle includes a drive assembly, front wheels, rear wheels, a frame assembly, a battery pack, and a drive train. The drive assembly includes an electric motor arranged on the frame assembly. The battery pack is used to supply electric energy for the electric motor. The drive train includes a drive axle assembly and a drive shaft. The electric motor transmits a torque to the drive axle assembly through the drive shaft, and the drive shaft is positioned below the battery pack.

The object of the disclosure is to provide an electric off-road vehicle with low emission, zero pollution, low running noise and strong torque.

BRIEF DESCRIPTION OF THE DRAWINGS

FIG. 11 is a perspective view of a five-in-one integration module used in the off-road vehicle of FIG. 1, including an electric motor, a control assembly, a gearbox, a drive shaft offset, and a rear drive axle assembly;

DETAILED DESCRIPTION

For better understanding of the above objects, features and advantages of the present disclosure, the embodiments of the present disclosure will be described in detail below with reference to the accompanying drawings. In the following description, numerous details are set forth in order to better understand the present disclosure. However, the present disclosure may be implemented in many other ways different from those described herein, and those skilled in the art can make similar modifications and improvements without departing from the teachings of the present disclosure. Therefore, the present invention is not limited by specifics of the embodiments disclosed below.

Figure 1:
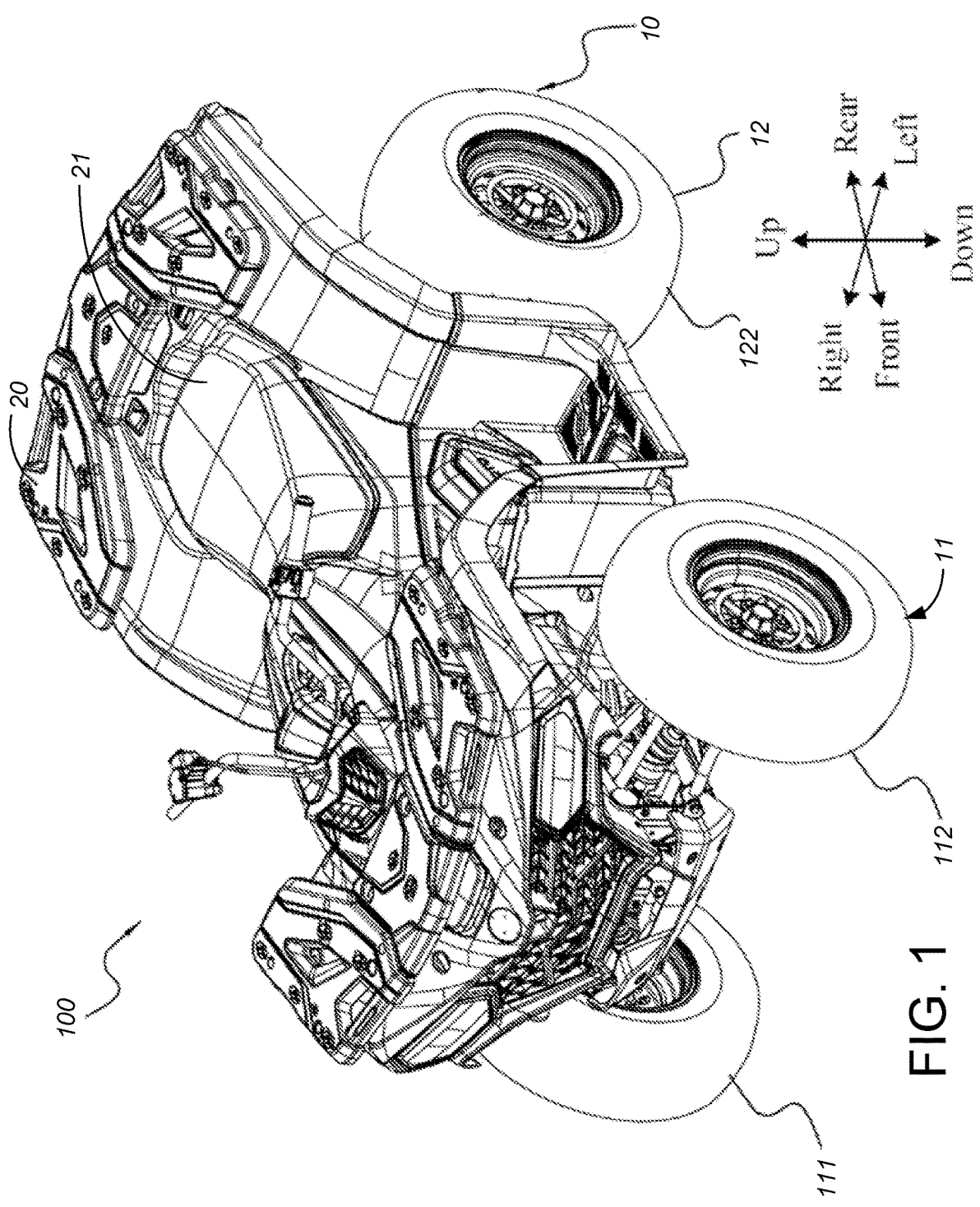
FIG. 1 is a front perspective view of an electric off-road vehicle according to the present invention.
Figure 2:
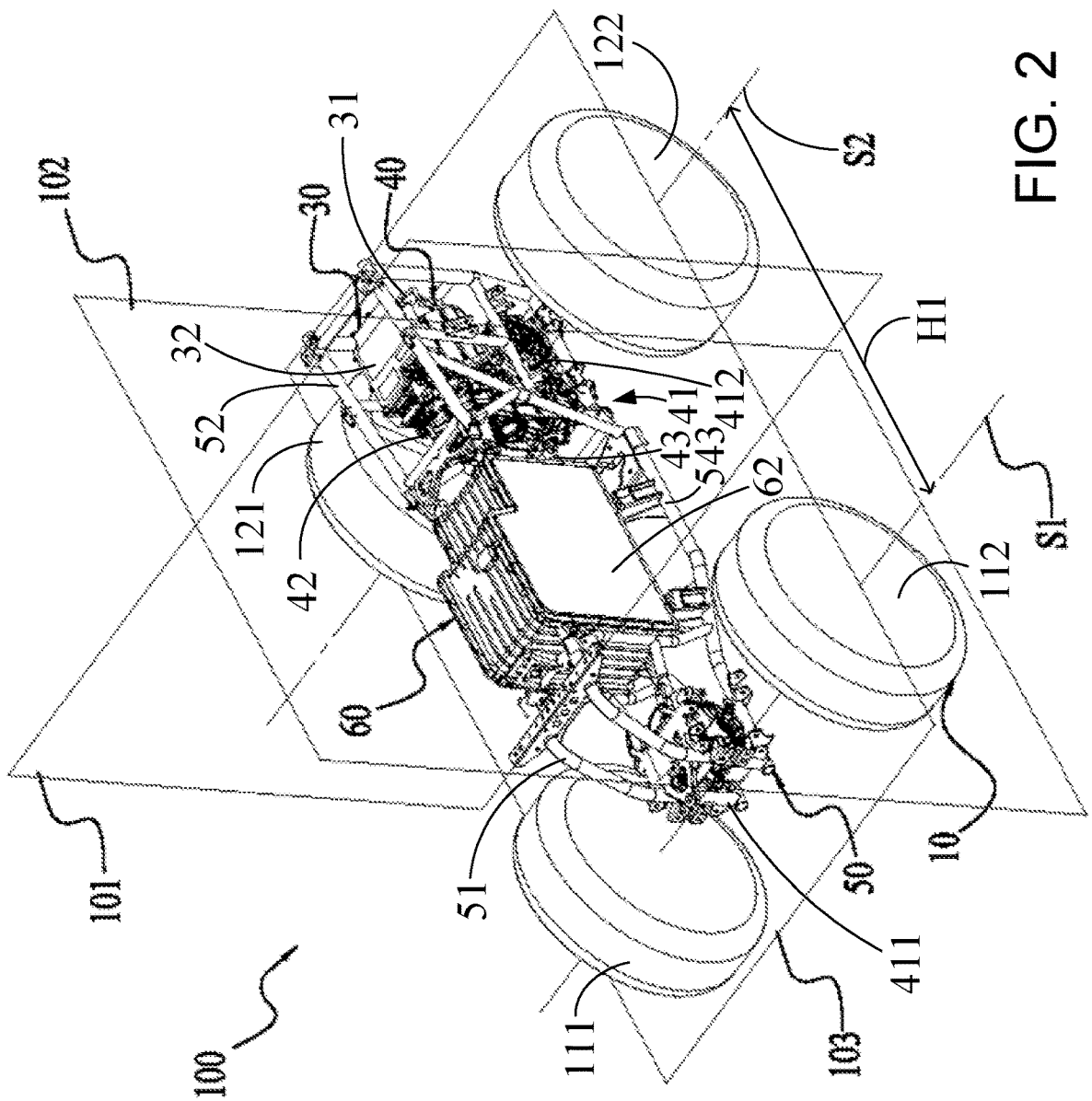
FIG. 2 is a front perspective view of a battery pack, motor assembly and drive train arranged on the frame within the electric off-road vehicle of FIG. 1, schematically showing the wheels/tires.

FIG. 1 shows an electric off-road vehicle 100, which includes a plurality of wheels/tires 10 preferably including two front wheels 11 (a right front wheel 111 and a left front wheel 112) and two rear wheels 12 (a right rear wheel 121 and a left rear wheel 122). In this preferred embodiment, the wheels and tires of the front wheels 11 are the same diameter as the wheels and tires of the rear wheels 12, but the rear wheels 12 are wider (such as within the range of 25 to 75 mm wider) than the front wheels 11. In other embodiments, the front wheels and rear wheels may have the same width, and/or the front wheels and rear wheels may have different diameters. The off-road vehicle has a vehicle cover 20 which covers and protects many of the vehicle components. A straddle type seat 21 is preferably provided for at least the driver and possibly for an additional passenger. Under the vehicle cover 20 as shown in FIG. 2, the electric off-road vehicle 100 includes a prime mover assembly 30, a drive train 40, a frame assembly 50, and a battery pack 60. The general orientations of front, rear, up (upper), down (lower), left and right for the off-road vehicle 100 are defined in FIG. 1. The terms longitudinal (i.e., in the front-back direction), transverse (i.e., in the right-left direction), vertical (i.e., in the up-down direction) and horizontal (i.e., perpendicular to the up-down direction) when used herein referring to measurements are exactly in such direction as defined in FIG. 1, but when used herein referring to structure simply indicate the general (not exact) direction that such structure runs.

The prime mover assembly 30 includes an electric motor 31. The drive train 40 includes drive axle components 41 turning the wheels 10, a gearbox 42 adjusting the direction and/or rate of rotation of the motor 31, and drive shaft structure 43 providing torque from the gearbox 42 to the drive axle components 41. The vehicle cover 20 at least partially covers the frame assembly 50 as well as the prime mover assembly 30, the drive train 40 and the battery pack 60. The frame assembly 50 includes a front frame assembly 51 and a rear frame assembly 52, with the battery pack 60 arranged at a middle longitudinal position of the vehicle 100 between the front frame assembly 51 and the rear frame assembly 52. The drive axle components 41 include a front drive axle assembly 411 and a rear drive axle assembly 412. The front wheels 11 and the front drive axle assembly 411 are arranged on the front frame assembly 51, typically by a front suspension (not shown). The rear wheels 12 and the rear drive axle assembly 412 are arranged on the rear frame assembly 52, typically by a rear suspension (not shown).

Figure 3:
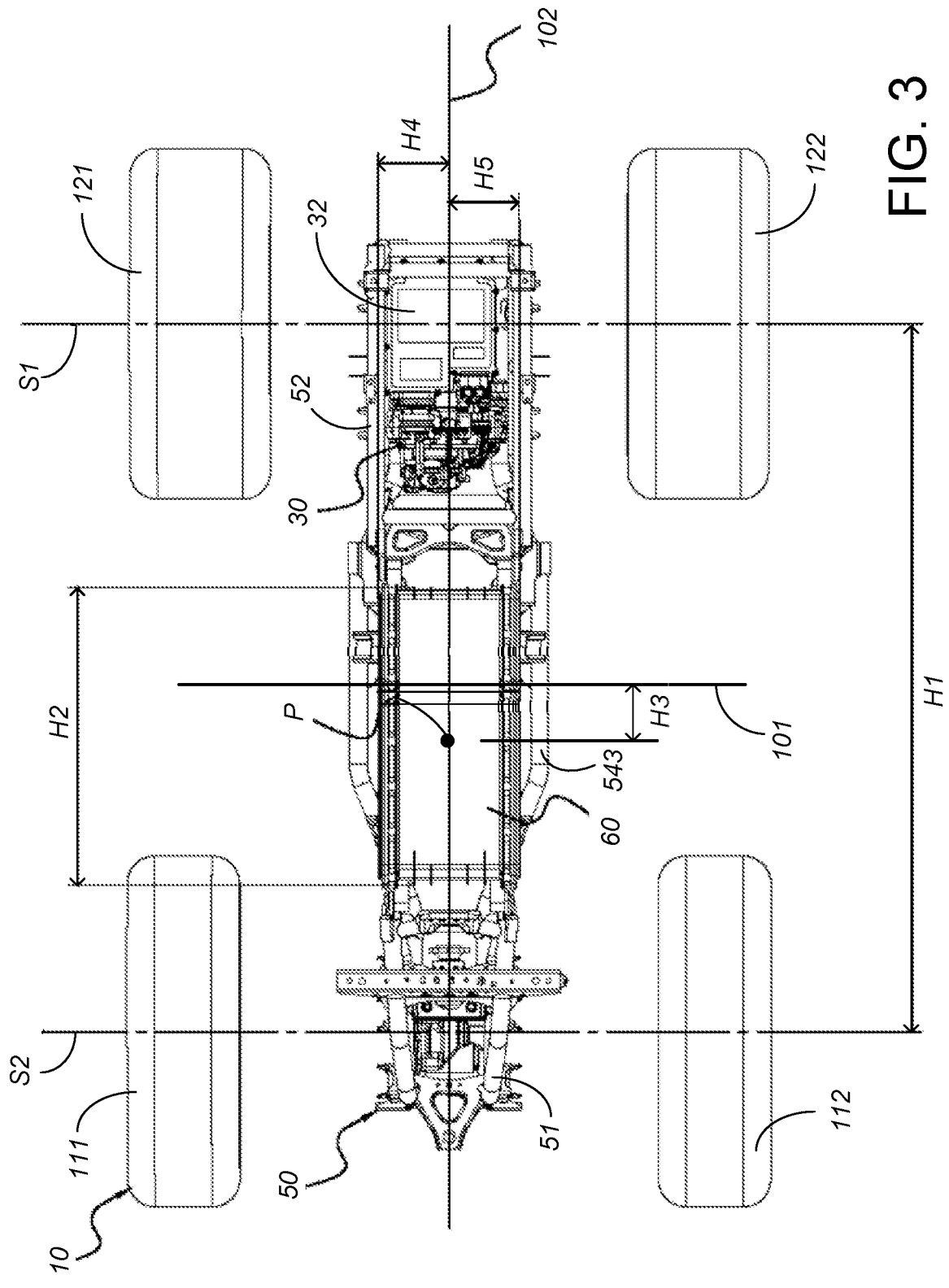
FIG. 3 is a top view of the battery pack, motor assembly and drive train arranged on the frame and schematic wheels/tires of FIG. 2.
Figure 4:
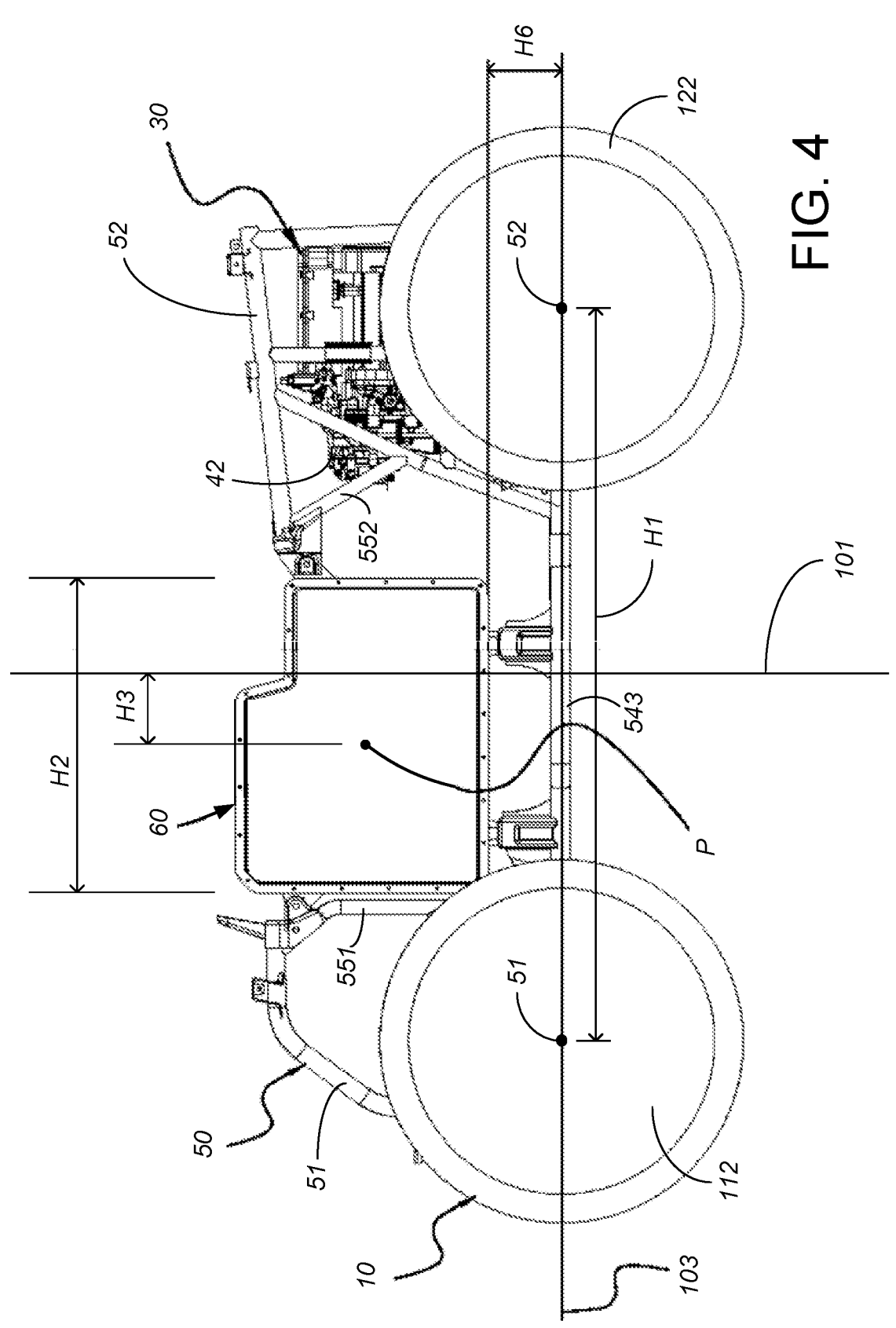
FIG. 4 is a side view of the battery pack and motor assembly arranged on the frame and schematic wheels/tires of FIGS. 2 and 3.

Referring to FIGS. 2-4, the battery pack 60 is electrically connected to the prime mover assembly 30 to provide electric energy for the prime mover assembly 30. A straight line S1 and a straight line S2 are respectively defined by connecting two center points of the two front wheels 11 and by connecting two center points of the rear wheels 12. A horizontal distance between the straight line S1 and the straight line S2 is defined as axle spacing H1. The maximum horizontal length occupied by the battery pack 60 along the front-rear direction of the electric off-road vehicle 100 is defined as a battery pack length H2. In preferred embodiments, the ratio of battery pack length H2 to axle spacing H1 is in the range between 0.1 and 0.35, which can reasonably avoid a longer or larger frame for containing the battery pack, effectively reduce the overall length of the frame 50, and improve the integrity, stability and aesthetics of the off-road vehicle 100. A transverse midplane 101 is defined as a plane perpendicular to the length direction of electric off-road vehicle 100 and equidistant from the straight line S1 and a straight line S2. In a preferred embodiment, the transverse midplane 101 at least partially goes through the battery pack 60. A horizontal distance H3 between the center of gravity P of the battery pack 60 and the transverse midplane 101 is preferably in the range of 0 mm to 1000 mm, more preferably in the range of 0 mm to 600 mm, and most preferably in the range of 0 mm to 300 mm. It should be noted that the center of gravity P of the battery pack 60 may be in front of the transverse midplane 101 or behind the transverse midplane 101. The center of gravity P of the battery pack 60 may be behind the transverse midplane 101 to balance the electric off-road vehicle 100 when the prime mover assembly 30 is arranged on the front end or when various heavier components are arranged on the front end. The position of the battery pack 60 greatly impacts the center of gravity of the whole electric off-road vehicle 100 when the battery pack 60 is relatively larger in volume and weight than the prime mover assembly, drive assembly and/or electric control assembly. The proper position for the battery pack 60 is preferably substantially located in the middle of the electric off-road vehicle 100, improving the stability of the electric off-road vehicle 100. In one preferred (but not depicted) embodiment, the center of gravity P of the battery pack 60 is positioned on the transverse midplane 101, that is to say, the distance H3 between the center of gravity P of the battery pack 60 and the transverse midplane 101 is 0 mm.

Referring to FIGS. 2 and 3, a longitudinal midplane 102 is defined as a plane perpendicular to the transverse midplane 101 and substantially equidistant from the leftmost and rightmost ends of the electric off-road vehicle 100. The preferred electric off-road vehicle 100 is substantially left-right symmetrical relative to the longitudinal midplane 102. In preferred embodiments, a horizontal distance H4 between the leftmost end of the battery pack 60 and the longitudinal midplane 102 is in the range of 0 mm to 180 mm, and more preferably 30 mm to 165 mm, and most preferably (for straddle-type vehicles) in the range of 60 mm to 150 mm. On the other side, a horizontal distance H5 between the right-most end of the battery pack 60 and the longitudinal midplane 102 is preferably in the similar range of 0 mm to 180 mm or more preferably 30 mm to 165 mm, and most preferably 60 mm to 150 mm. The preferred ranges of H4 and H5 effectively control the whole width of the electric off-road vehicle 100, and prevent one side of the electric off-road vehicle 100 from being too wide to the detriment of the layout of the drive train 40 and the electric control modules.

The ratio of the distance H4 to the distance H5 is preferably the range between 0.125 and 8, and more preferably the range between 0.25 and 4, and most preferably in the range between 0.5 and 2. Such preferred ranges limit the horizontal distribution of battery pack 60 on the electric off-road vehicle 100. It may be noted that the battery pack 60 may be arranged on the left or right side of the electric off-road vehicle 100. However, if the battery pack 60 is located too far to one side, the electric off-road vehicle 100 will have a roll-over risk when it turns in one of the left or right directions. Therefore, it is necessary to reasonably limit the position of the battery pack 60 on the electric off-road vehicle 100. In the most preferred embodiments, the battery pack 60 is balanced on the longitudinal midplane 102 and the ratio of the distance H4 to the distance H5 is 1.

Referring to FIGS. 2 and 4, a horizontal axle plane 103 is defined as a plane on which the straight line S1 and the straight line S2 are positioned, in preferred embodiments perpendicular to the up-down direction of the electric off-road vehicle 100. In preferred embodiments, a vertical distance H6 between the bottom-most end of the battery pack 60 and the horizontal axle plane 103 is preferably in the range between 0 mm and 370 mm, more preferably in the range between 0 mm and 250 mm, and most preferably in the range between 0 mm and 100 mm. The smaller the distance H6, the larger the upper space accommodating the battery pack 60 to allow battery packs with larger capacity, and the lower the center of gravity of the electric off-road vehicle 100, the more stable the electric off-road vehicle

5

6

100. However, if the distance H6 between the bottom-most end of the battery pack 60 and the horizontal axle plane 103 is too small, the ability of the electric off-road vehicle 100 to traverse over obstacles is reduced. Therefore, the distance H6 between the battery pack 60 and the horizontal axle plane 103 should be limited within a reasonable range, which can enable the electric off-road vehicle 100 to have better ability to traverse over obstacles and to control the center of gravity distribution.

In preferred embodiments which use a single electric motor, the prime mover assembly 30 and the gearbox 42 are arranged on the rear frame assembly 52. The prime mover assembly 30 includes the electric motor 31 as well as a control assembly 32, preferably positioned immediately above the electric motor 31. The gearbox 42 adjusts the rotational direction and/or speed of rotation and transmits the torque of the electric motor 31 to the drive shaft structure 43. The control assembly 32 preferably includes a microprocessor-based engine control unit, and controls the electrical input and/or torque output of the electric motor 31 and controls the gearbox 42. More particularly, the prime mover assembly 30 (including both the electric motor 31 and the control assembly 32) and the gearbox 42 are preferably provided as part of an integration module 70, which also includes at least a rear differential 4121 and is further explained with reference to FIGS. 11-13.

Figure 5:
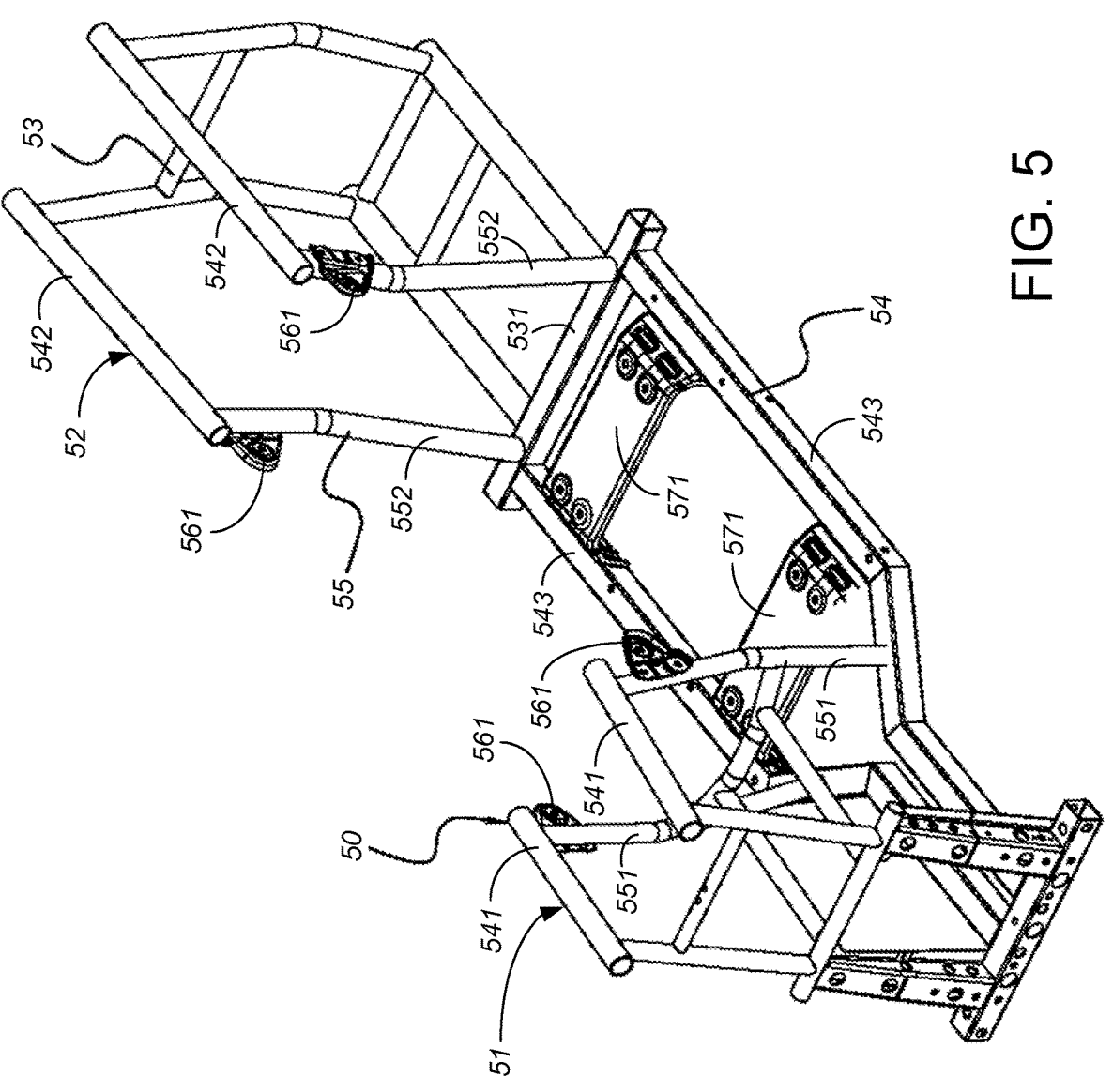
FIG. 5 is a front perspective view of an alternative frame assembly for the off-road vehicle of FIG. 1.
Figure 6:
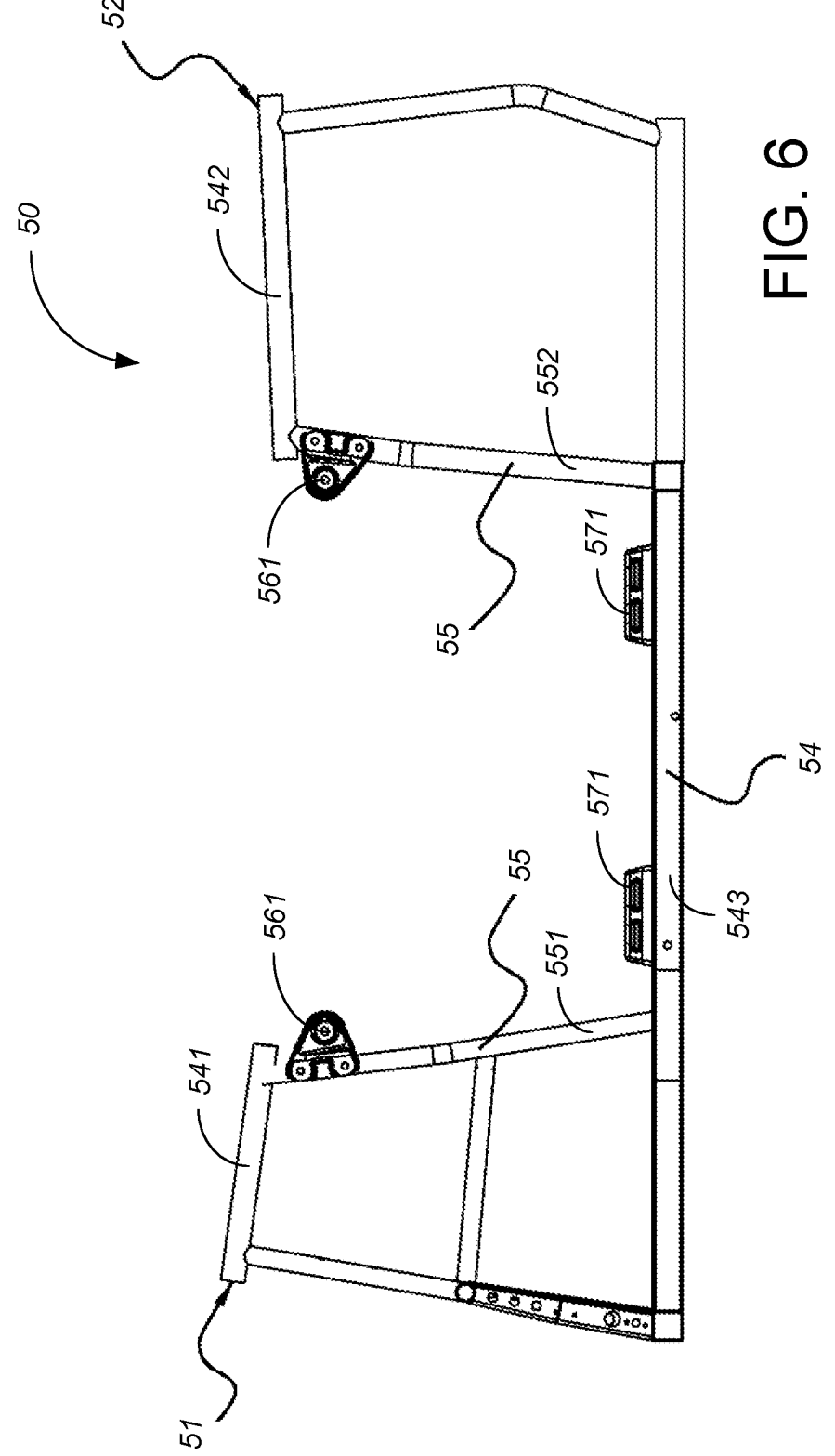
FIG. 6 is a side view of the frame assembly of FIG. 5.
Figure 7:
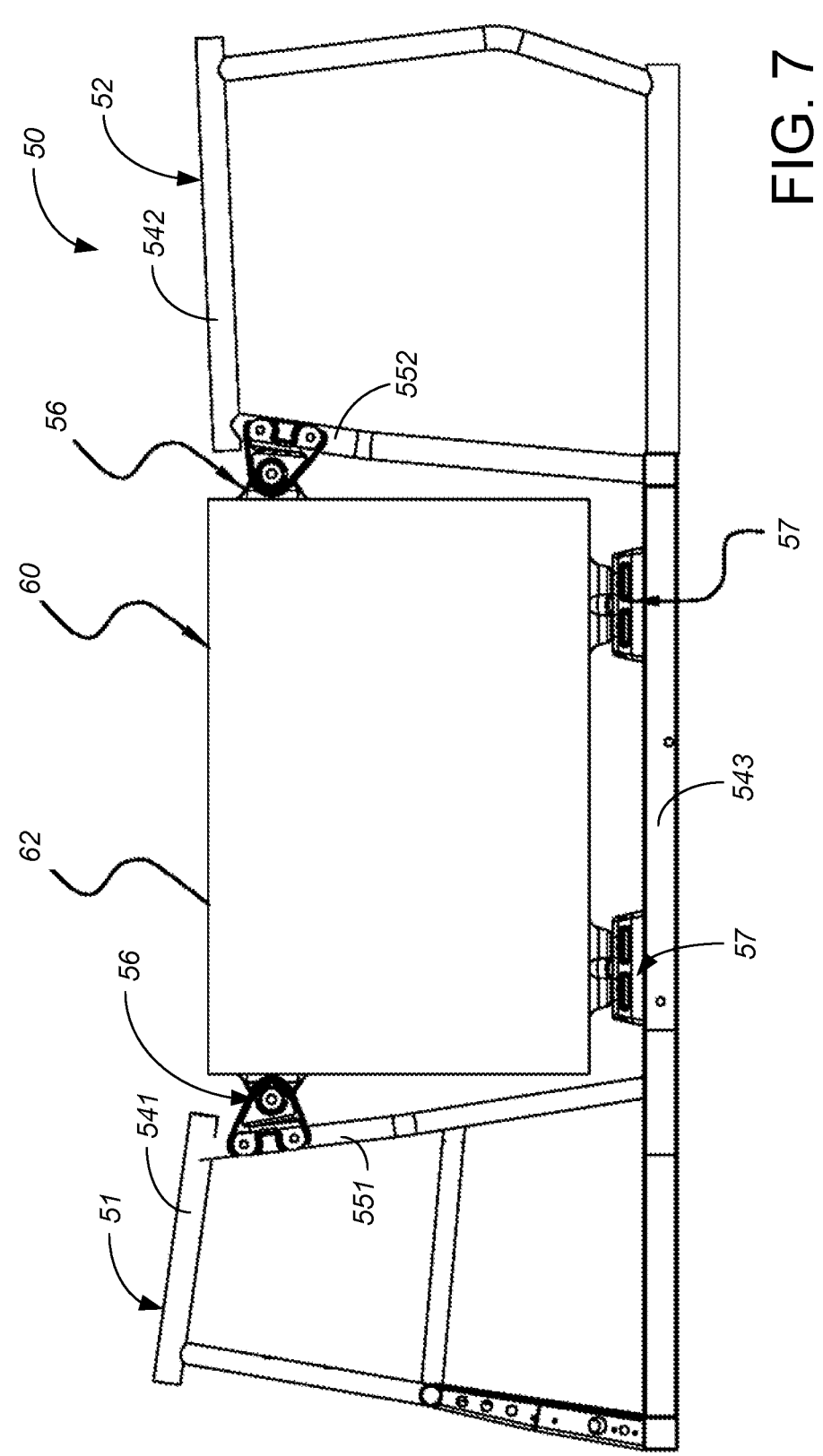
FIG. 7 is a side view of the frame assembly of FIGS. 5 and 6, on which a battery pack arranged.

FIGS. 2-4 depict a first preferred embodiment of the frame 50 including the front frame assembly 51 and the rear frame assembly 52, whereas FIGS. 5-7 depict a second preferred embodiment of the frame 50 including the front frame assembly 51 and the rear frame assembly 52. In both embodiments, the frame 50 is bilaterally symmetrical. The frame 50 is generally formed by a collection of bent and welded tubular bars, including transversely extending bars 53, longitudinally extending bars 54 and vertically extending bars 55. The top of the front frame assembly 51 is preferably defined by two longitudinally extending front top bars 541, and the top of the rear frame assembly 52 is preferably defined by two longitudinally extending rear top bars 542. The embodiment of FIGS. 2-4 includes one or more transversely extending bars 53 connecting the front top bars 541 and one or more transversely extending bars 53 connecting the rear top bars 542, whereas the embodiment of FIGS. 5-7 has all the transversely extending bars 53 positioned well below the front top bars 541 and the rear top bars 541. The rear extent of the front frame assembly 51 is preferably defined by two vertically extending front midposts 551 each extending downwardly from their respective front top bar 541, and the front extent of the rear frame assembly 52 is preferably defined by two vertically extending rear midposts 552 each extending downwardly from their respective rear top bar 542. The longitudinally extending bars 54 include two base rails 543 running horizontally at least between the front frame assembly 51 and the rear frame assembly 52. In both embodiments, the front frame assembly 51 and the rear frame assembly 52 are longitudinally separated by a space which is generally occupied by the battery pack 60. The space between the front frame assembly 51 and the rear frame assembly 52 (i.e., the space between the front midposts 551 and the rear midposts 552 and above the base rails 543) is referred to as an accommodation space. In the preferred embodiment, the accommodation space is below the seat 21 and straddled by the driver and any passenger. The preferred embodiments have a large accommodation space, so the battery pack 60 of the electric off-road vehicle 100 can have a large volume for providing sufficient electric energy and long-lasting and powerful torque for the electric off-road vehicle 100.

A first preferred battery pack 60 is shown in FIGS. 2-4, and a second preferred battery pack is shown in FIG. 7. The preferred battery packs 60 generally have a boxy shape, with a width that is similar to the width between the two front midposts 551 and similar to the width between the two rear midposts 552. The preferred battery pack 60 includes a battery case 62 and a plurality of batteries (not separately shown) closely arranged inside the battery case 62, avoiding shaking or collision of batteries caused by excess space. The side view shape of the battery pack 60 is generally rectangular, but, as can be seen by comparing the shapes of the battery pack 60 of FIG. 2-4 with the shape of the battery pack 60 of FIG. 7, can have small non-rectangular features to accommodate desired internal structure. The front end of the battery case 62 is connected to each of the front midposts 551 of the front frame assembly 51, each at an elevation more than half way up the front midposts 551 but below the front top bars 541. The rear end of the battery case 62 is connected to each of the rear midposts 552 of the rear frame assembly 52, each at an elevation more than half way up the rear midposts 552 but below the rear top bars 542. Using these connection locations, the battery case 62 strengthens the connection between the front frame assembly 51 and the rear frame assembly 52, so that the front frame assembly 51, the battery case 62, the rear frame assembly 52 and the base rails 543 jointly carry loads. In other embodiments, the connection locations for fixing the battery pack 60 may be directly with the front top bars 541 and/or directly with the rear top bars 542, or may be with one or more of the transverse bars 53 in a similarly raised position at the front and rear of the battery pack. Because the battery case 62 transmits loads between the front frame assembly 51 and the rear frame assembly 52, as well as potentially sideways directed loads between the two front top bars 541 and/or between the two rear top bars 542, the battery case 62 should be formed of a strong, durable material, such as steel, aluminum 6063, or other castings with higher strength. The preferred connections between the front and rear ends of the battery case 62 and the frame 50 are made by connecting structures 56.

Figures 8, 9:
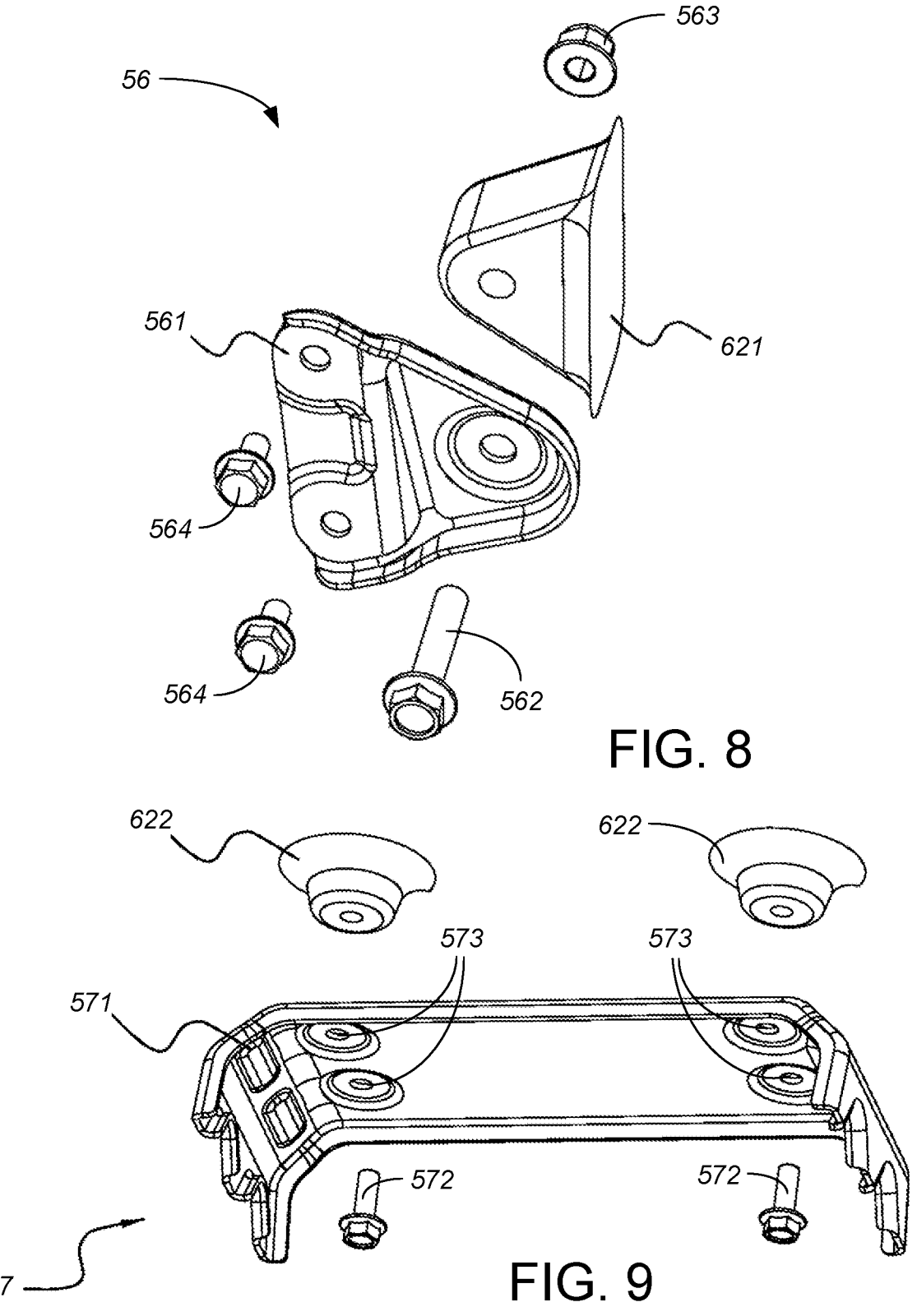
FIG. 8 is an exploded view of the connecting structure used in the alternative frame assembly of FIGS. 5-7.
FIG. 9 is an exploded view of the connecting plate structure used in the alternative frame assembly of FIGS. 5-7.

FIG. 8 more closely shows one of the four connecting structures 56. Each connecting structure 56 includes a bracket 561 secured to one of the midposts 551, 552, a connection ear 621 secured to the battery case 62, and a connection bolt 562 extending through openings in both the bracket 561 and the connection ear 621 and secured by a connection nut 563. The bracket 561 may be detachably secured to its midpost 551, 552 such as by using bolts 564, or alternatively could be welded or otherwise fixed to its midpost 551, 552. Attachment of the bracket 561 using bolts 564 reduces the manufacturing difficulty of the frame assembly 50, and enhances the flexibility of the installation position of the connecting structure 56 for adapting different vehicle models and volumes of the battery pack 60. The connection ear 621 may be integrally secured to the battery case 62 such as by welding, or alternatively could be detachably connected. In any of these cases, the use of the connection bolt 562 enables the connecting structure 56 to detachably connect the battery case 62 to the frame 50, thereby allowing easy replacement of the battery 60. The use of the single connection bolt 562 in each connecting structure 56 also serves as a hinge/pivot location enabling some degree of flexibility of the frame structure 50, allowing the frame structure 50 to better withstand impacts or intense loads without cracking various welds within the frame structure 50 due to localized flexing of the metal. While the preferred embodiments use two connecting structures 56 at the front of the battery case 62 and two connecting structures 56 at the rear of the battery case 62 (four connecting structures 56 total), alternative embodiments use only single connecting structures at the front and rear of the battery case (two connecting structures total), or use three or more connecting structures at either or both the front and rear of the battery case (more than four connecting structures total). The use of four connecting structures 56 total ensures the stability of the installation of the battery pack 60 to the frame assembly 50, as well as better transmitting twisting loads between the front frame assembly 51 and the rear frame assembly 52. The connecting structures 56 durably and reliably transmit loads between the front and rear frame assemblies 51, 52 through the battery case 62 without cracking over years of rough riding of the off-road vehicle 100.

If desired, the battery pack 60 may simply be placed on top of the base rails 543, or the connecting structures 56 could suspend the battery pack 60 above the base rails 543. More preferably, in addition to securing the battery pack 60 to the front frame assembly 51 and to the rear frame assembly 52, the battery pack 60 is also secured to the base rails 543 such as using the connecting plate structures 57 shown in FIGS. 5 and 9. The preferred embodiments use two connecting plate structures 57, one more forward and one more rearward, but underneath the battery case 62. Each connecting plate structure 57 includes a base plate 571 extending transversely between the two base rails 543. The preferred embodiments integrally connect the base plates 571 between the base rails 543 such as by welding, but alternative embodiments detachably connect the base plates 571 to the base rails 543 such as using threaded bolts. The base plates 571 are preferably arched so as to raise the bottom of the battery case 62 above the tops of the base rails 543, thereby providing more room for the drive shaft structure 43 to extend under the battery case 62. Four connection bosses 622 are secured to the bottom of the battery case 62, preferably near the four bottom corners of the boxy shape of the battery case 62, such as by welding. Each connection boss 622 includes a vertically oriented internally threaded hole which threadingly receives a vertically oriented bolt 572. The base plates 571 each include at least one, and more preferably multiple bolt holes 573, for each bolt 572. The use of multiple bolt holes 573 for each bolt 572 enhances the flexibility of the installation position of the connecting plate structure 57 for adapting different vehicle models and volumes of the battery pack 60. Alternatively, the bolts 572 may extend through slots (not shown) in the base plate 571 to add flexibility to positioning for the bolts 572. The use of four bolts 572 to attach the four bottom corners of the battery case 62 to the base plates 571 and therethrough to the base rails 543 prevent the horizontal displacement of the battery pack 60 and further strengthen the base rails 543 in transferring loads between the front frame assembly 51 and the rear frame assembly 52. The use of four bolts 572 also allow ready detachment on occasions where the battery pack 60 needs to be replaced. Alternatively, more than four bolts 572 could be used with more than four connection bosses 622 welded to the bottom of the batter case 62, such as eight bolts and eight connection bosses using all the bolt holes 573 (four per plate 571) shown in FIGS. 5 and 9.

Figure 10:
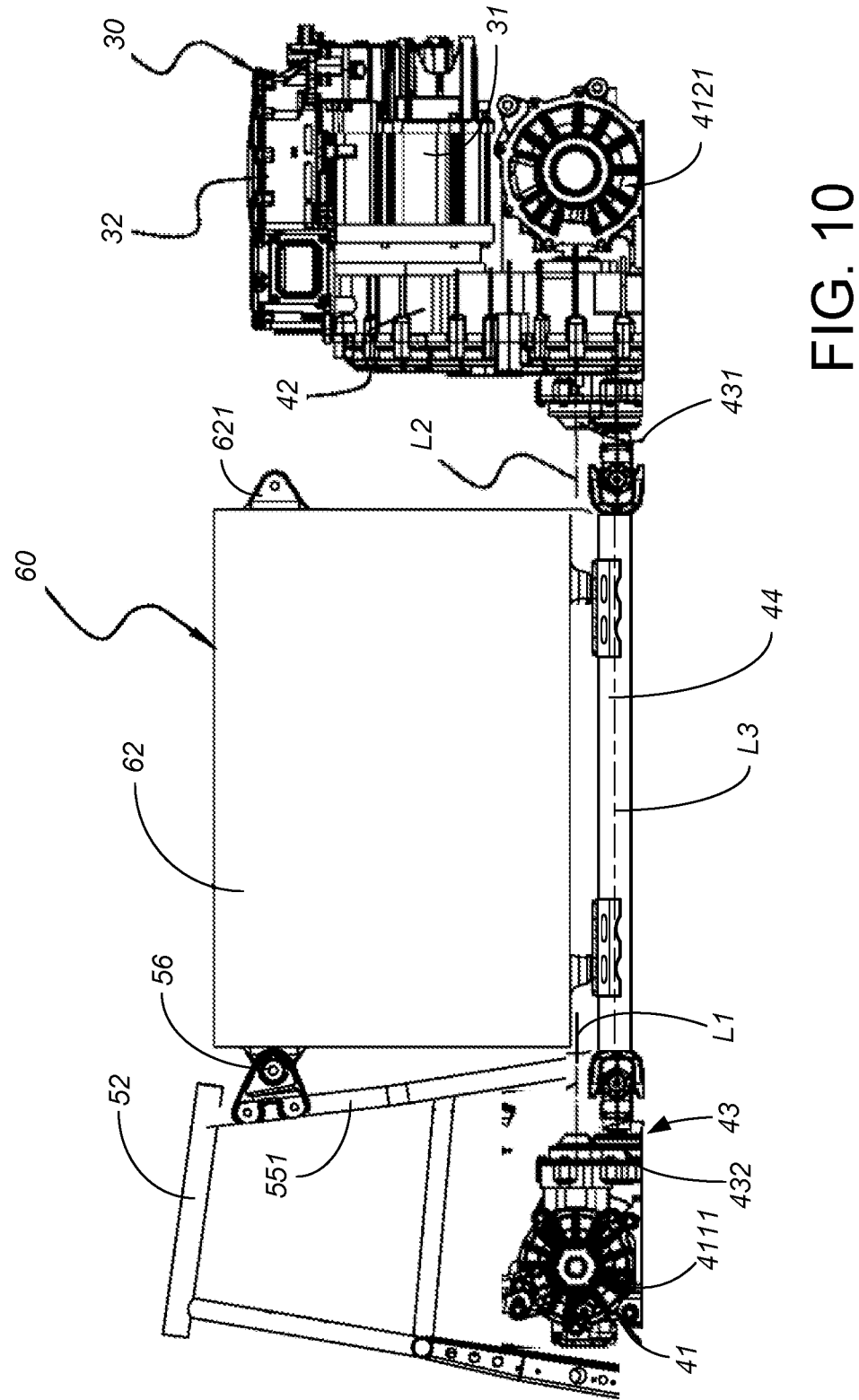
FIG. 10 is a side view of the front frame assembly and battery pack of FIG. 7 shown relative to a front drive axle assembly, drive shaft assembly and integration module.

FIG. 10 shows the preferred layout of the prime mover assembly 30 and drive train 40 relative to the front frame assembly 51 and battery pack 60 of FIGS. 5-7, omitting the rest of the frame so the prime mover assembly 30 and drive train 40 can be better seen. With the single motor 31 mounted rearward of the battery pack 60, the drive shaft structure 43 includes a front drive shaft 44 that extends under the battery pack 60. To provide more accommodation space for a larger battery pack 60, the drive shaft structure 43 also includes a rearward drive shaft offset mechanism 431 and a forward drive shaft offset mechanism 432. The drive shaft offset mechanisms 431, 432 enable a drive shaft 44 to be at a lower elevation than the input axis of the front and rear drive axle assemblies 411, 412. Specifically, the rotational axis for the input to the front drive axle assembly 411 is shown in FIG. 10 as L1, which intersects with the axis of rotation S1 of the front wheels 11; the rotational axis for the input to the drive shaft structure 43 is shown in FIG. 10 as L2, which intersects with the axis of rotation S2 of the rear wheels 12; and the rotational axis of the drive shaft 44 is shown in FIG. 10 as L3. In the preferred embodiment, the first line L1 and the second line L2 are substantially collinear, and the distance between the third line L3 and the lines L1 and L2 is greater than zero, with the third line L3 below the first line L1 and the second line L2. In the preferred embodiments, all three lines L1, L2 and L3 are within the longitudinal midplane 102 of the vehicle 100, though the rotational axis L3 of the drive shaft 44 in particular can easily be laterally offset. The lower position of the third line L3 and the drive shaft 44 provides not only a larger accommodation space but also allows a lower mounting position and center of gravity P of the battery pack 60.

The frame 50, and particularly any frame structure connecting the two base rails 543 such as the rearward cross bar 531 shown in FIG. 5 as well as the two base plates 571, cannot interfere with the front drive shaft 44. In the preferred embodiment, the rearward drive shaft offset mechanism 431 shown in FIG. 10 is positioned tight to the rearward cross bar 531 shown in FIG. 5, with the front drive shaft extending under the two base plates 571. Similarly, the forward drive shaft offset mechanism 432 shown in FIG. 10 is positioned tight to the location that the two base rails extend most inwardly toward the front of the frame 50. In alternative embodiments, the rearward cross bar 531 can be pushed further rearward, and/or the two base plates 571 can have raised center arches, to provide sufficient clearance room for the drive shaft structure 43 including the front drive shaft 44 and both drive shaft offset mechanisms 431, 432.

Figure 11:
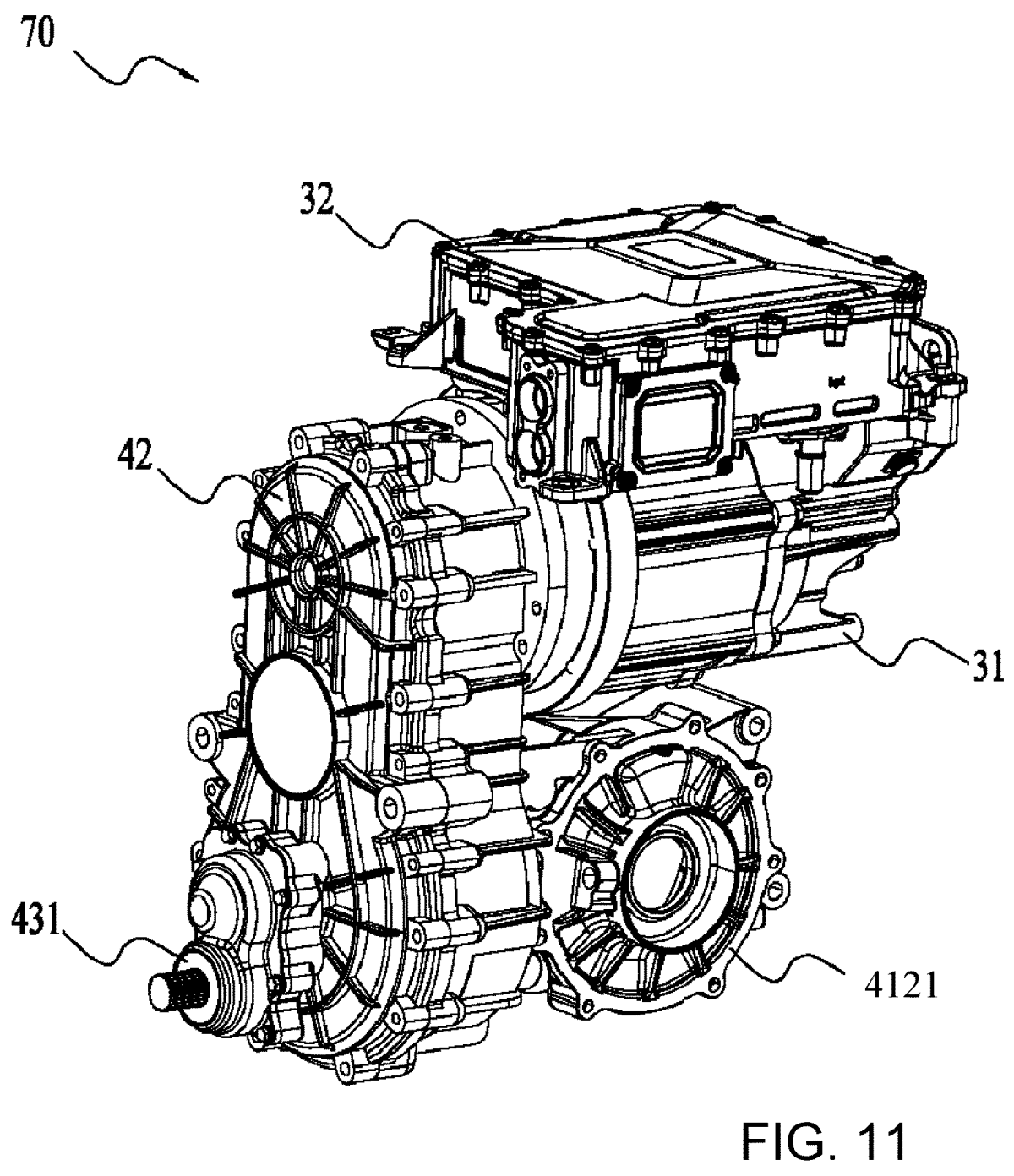
Figure 12:
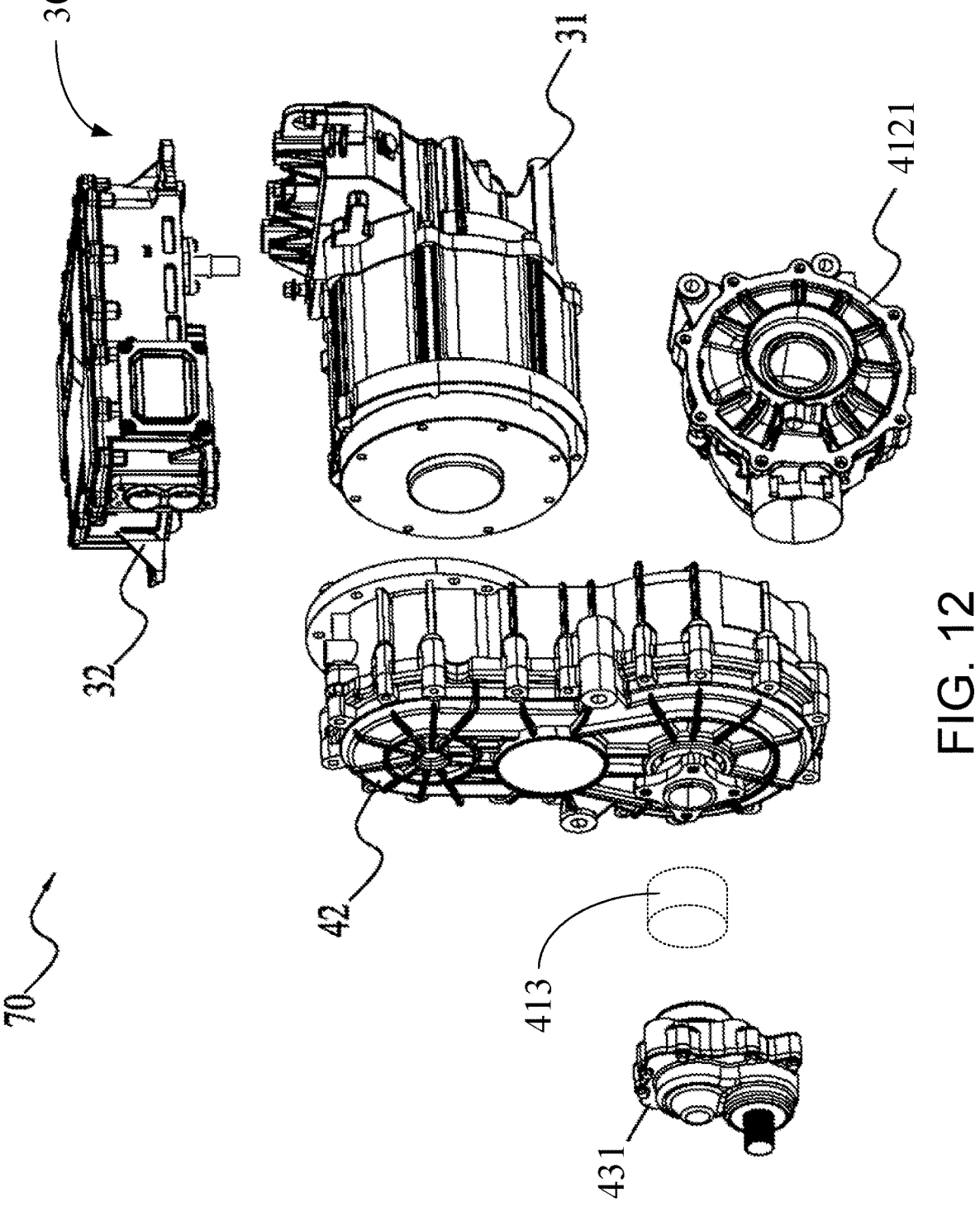
FIG. 12 is an exploded perspective view of the five-in-one integration module of FIG. 11.
Figure 13:
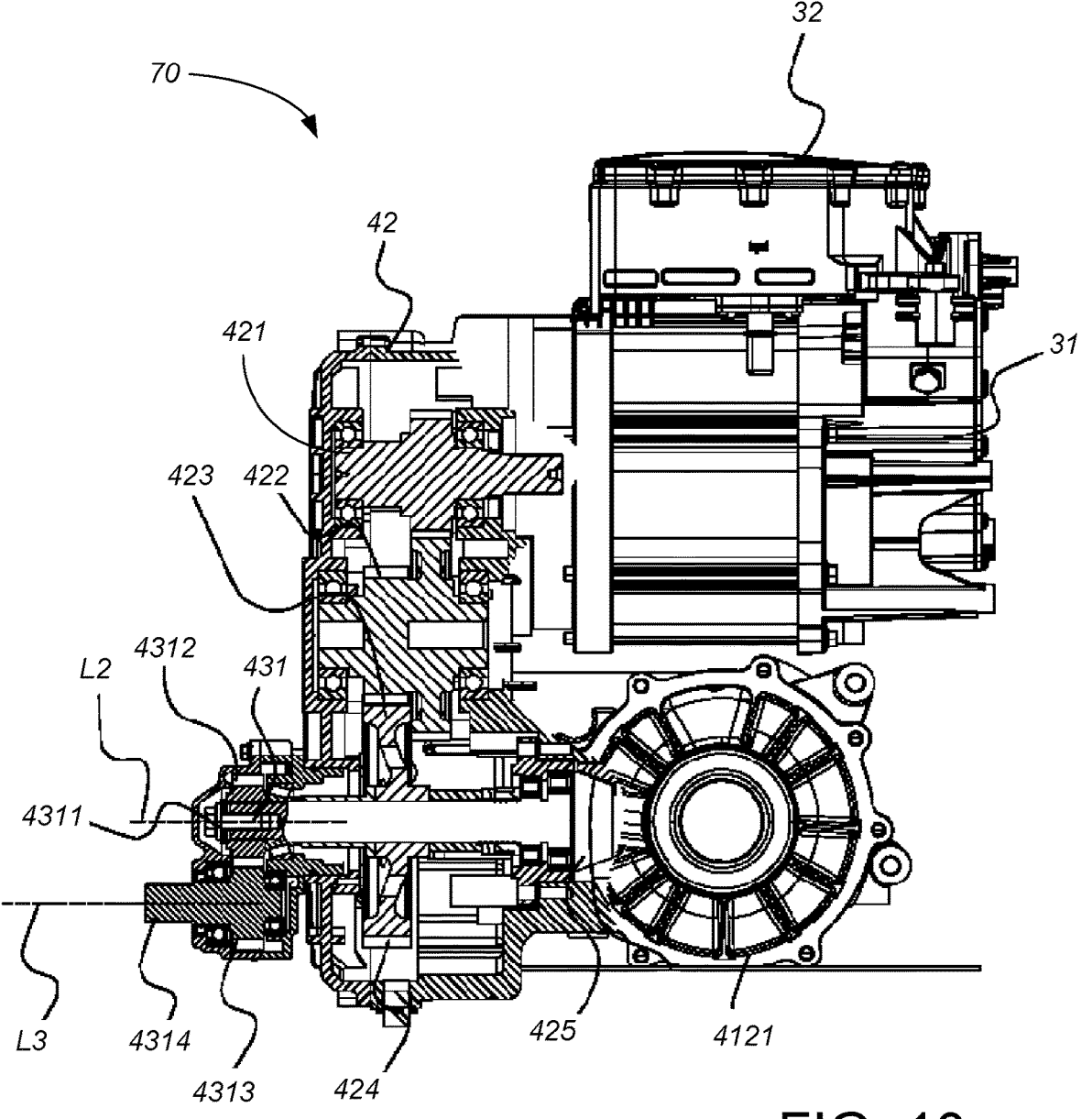
FIG. 13 is a side view, in partial cross-section, of the five-in-one integration module of FIGS. 11 and 12, with an alternative control assembly.

FIGS. 11-13 better show the preferred integration module 70 used in these embodiments. The integration module 70 includes the prime mover assembly 30 (including both the electric motor 31 and the control assembly 32) and the gearbox 42, as well as the rearward drive shaft offset mechanism 431 of the drive shaft structure 43 and the rear differential 4121 of the rear drive axle assembly 412, all pre-assembled as a five-in-one integration module 70 prior to installation of the complete integration module 70 into the vehicle. Pre-assembly of the integration module 70 allows for easier installation and/or removal of the components 31, 32, 42, 431, 4121 in the limited space and cramped environment of the off-road vehicle 100. In the preferred integration module 70, the electric motor 31 is positioned immediately above the rear differential 4121, and the control assembly 32 is positioned immediately above the electric motor 31. The gearbox 42 is arranged on the front side of the electric motor 31 and receives the torque output of the electric motor 31. The gearbox 42 extends downwardly, to output torque rearwardly directly to the input bevel gear of the rear differential 4121, as well to output torque forwardly to the rearward drive shaft offset mechanism 431 of the drive shaft structure 43. The components 31, 32, 42, 431, 4121 in the integration module 70 are fastened and connected by bolts or other fasteners. If desired, the integration module 70 may alternatively or additionally include an enclosure (not shown) for connecting these assemblies 31, 32, 42, 431, 4121. In another embodiment, the integration module 70 includes only the electric motor 31, the gearbox 42 and the rear differential 4121, with the control assembly 32 and the entire drive shaft assembly 43 being separately mounted.

If desired, a transfer case 413 (shown schematically in FIG. 12) may optionally be included, preferably positioned adjacent the rearward drive shaft offset mechanism 431 of the drive shaft structure 43, and more preferably between the gearbox 42 and the rearward drive shaft offset mechanism 431. The transfer case 413 controls connection and disconnection between the output of the gearbox 42 and the front drive axle assembly 411, thereby allowing the driver to switch between four-wheeled drive and two-wheeled drive (rear-wheel drive in the embodiment shown with the integration module 70 behind the battery case 60) of the electric off-road vehicle 100. This design can not only realize four-wheeled drive through a single electric motor, but also allow the driver to change driving mode according to the driving environment.

FIG. 13 shows internal gearing of the integration module 70 in an arrangement without a transfer case. Torque from the electric motor 31 is output to the input gear 421 of the gearbox 42. The gearbox 42 includes several intermediate gears 422, the position of which depends upon which park/reverse/neutral/high/low gear is selected by the driver, such that one of the intermediate gears 422 is meshed with the input gear 421. Depending upon which park/reverse/neutral/high/low gear is selected by the driver, one of the intermediate gears 422 is meshed with an output gear 423 of the gearbox 42, such that the gearbox 42 transmits torque from the input gear 421 to the output gear 423 of the gearbox 42 at the desired/selected direction and gear ratio whenever reverse, high or low gearing is selected. The output gear 423 of the gearbox 42 drives an output shaft 424. The output shaft 424 is fitted on one end (preferably the rearward end) with a bevel gear 425 as the input to input bevel gear the rear differential 4121, with the rear differential 4121 transferring that torque to the two rear wheels 11. The other end (preferably the forward end) of the output shaft 424 is fitted and secured, such as with a bolt 4311, into the input gear 4312 of the rearward drive shaft offset mechanism 431. The input gear 4312 is meshed with an output gear 4313 of the rearward drive shaft offset mechanism 431, driving the offset output shaft 4314. The offset output shaft 4314 preferably provides a splined connection to rotationally drive the drive shaft 44. The electric motor 31 is preferably oriented to output torque on a longitudinally oriented shaft, and all of the gears and shafts 421, 422, 423, 424, 425, 4312, 4313, 4314 rotate about axes which extend longitudinally, with the gearbox 42 lowering the torque output of the electric motor 31 down to the differentials 4121, 4111.

FIG. 13 also shows a different embodiment of the control assembly 32. The specific shape and configuration of the control assembly 32 is not central to the present invention. In other embodiments, the control assembly 32 is not even part of the integration module 70, but instead is positioned elsewhere in the off-road vehicle 100 and controls the electric motor 31, and possibly the gearbox 42 and any transfer case 413, using only electrical signals carried in wired connections.

Figure 14:
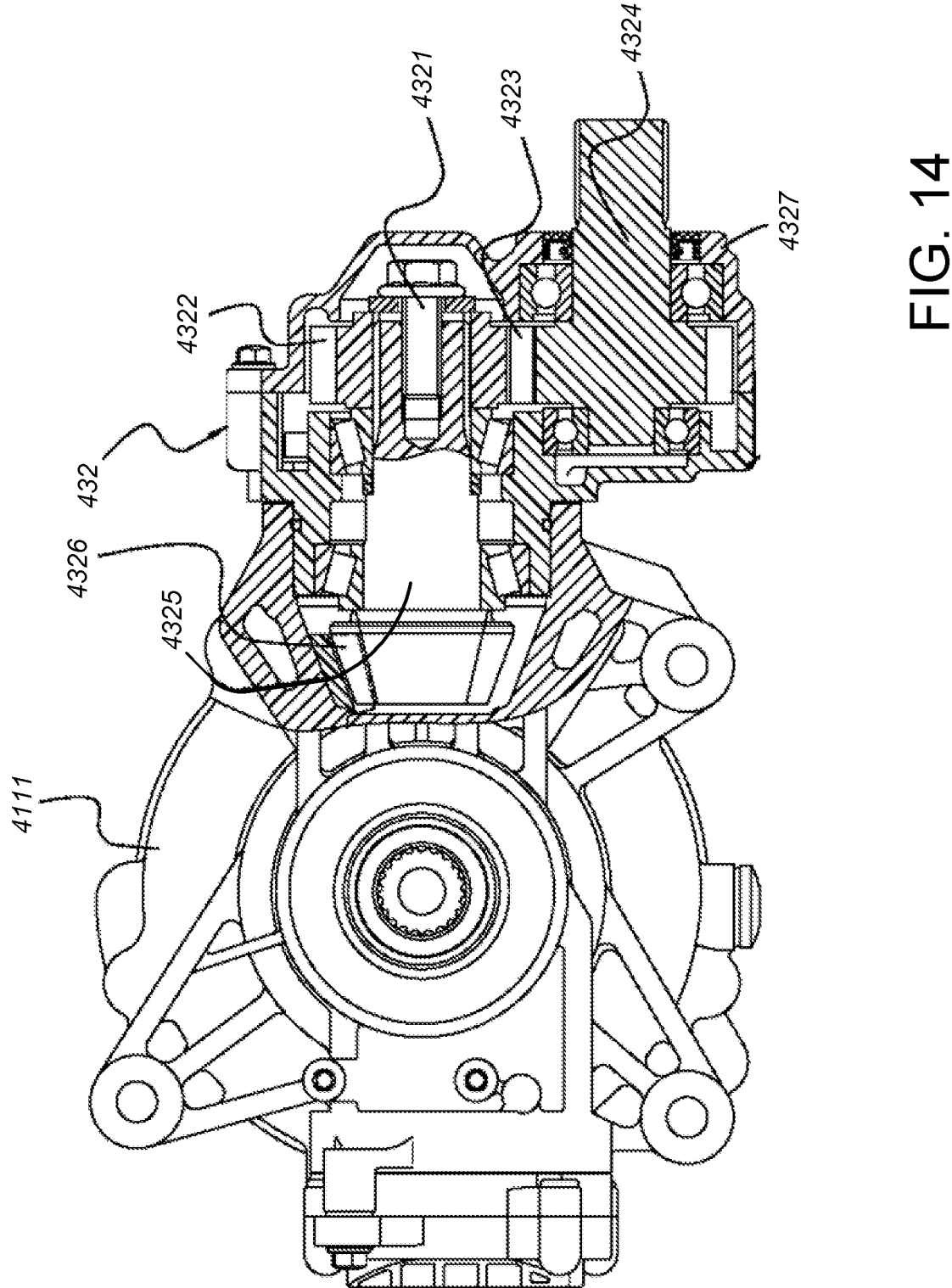
FIG. 14 is a side view, in partial cross-section, of the forward drive shaft offset mechanism and front drive axle assembly used in the off-road vehicle of FIG. 1.

FIG. 14 shows internal gearing between the drive shaft 44 and the front drive axle assembly 411. The forward drive shaft offset mechanism 432 is essentially identical to the rearward drive shaft offset mechanism 431, but turned 1800 so inputs become outputs and vice versa. Namely, the drive shaft 44 transmits torque through a splined connection to an offset input shaft 4324, which drives an input gear 4323. The input gear 4323 is meshed with an output gear 4322 driving the output shaft 4325 and fitted and secured on the output shaft 4325 such as with a bolt 4321. The output shaft 4325 includes a bevel gear 4326 as the input to the input bevel gear of the front differential 4111, with the front differential 4111 transferring that torque to the two front wheels 10.

In both the rearward drive shaft offset mechanism 431 and the forward drive shaft offset mechanism 432, the moving parts are contained within a two piece housing have a detachable shell 4317, 4327. Removal of the detachable shell 4317, 4327 allows access to the bolt 4311, 4321 for assembling/disassembling the drive shaft assembly 43 relative to the front and rear drive axle assemblies 411, 412.

Figure 15:
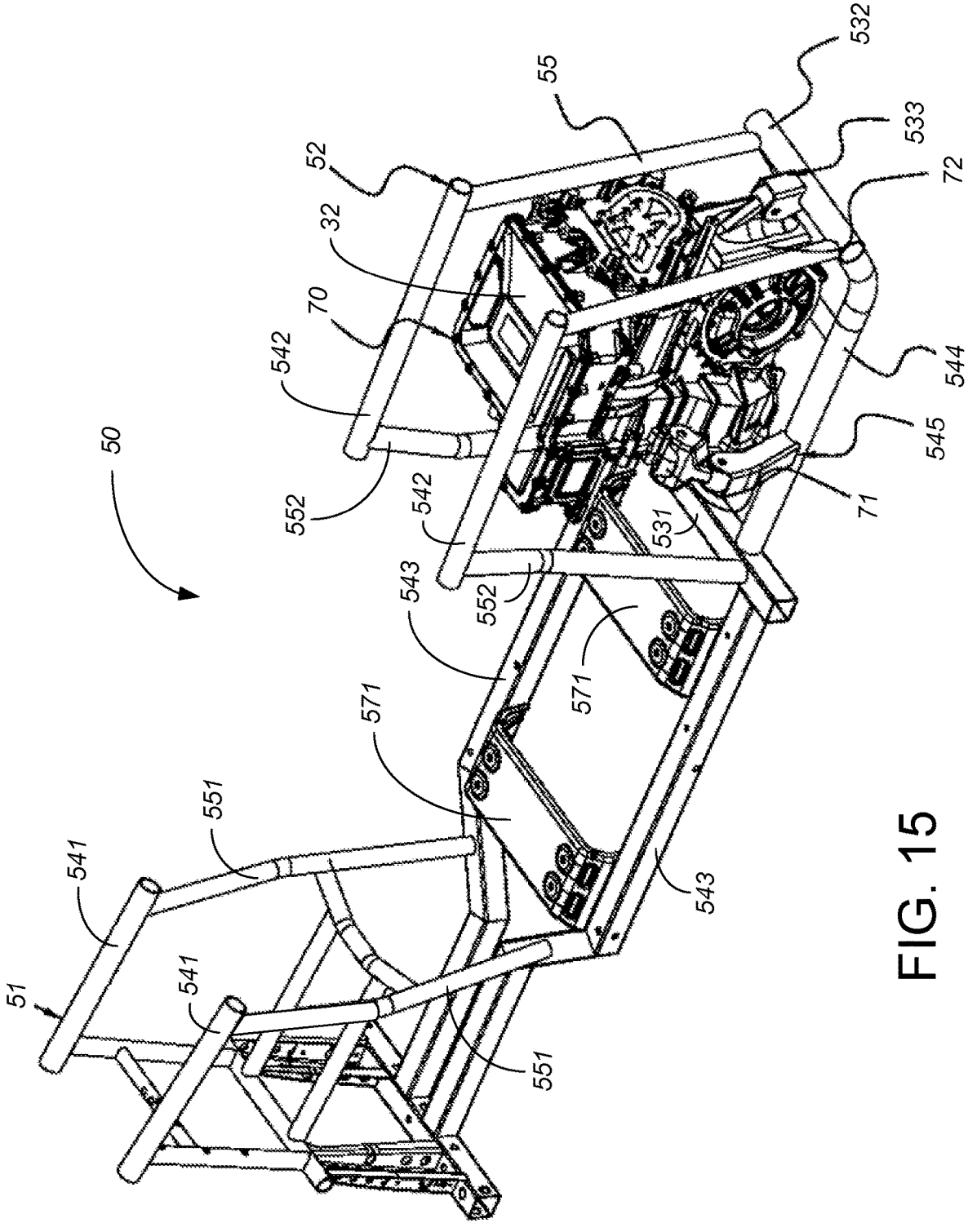
FIG. 15 is a rear perspective view of the integration module connected to an alternative frame assembly.
Figure 16:
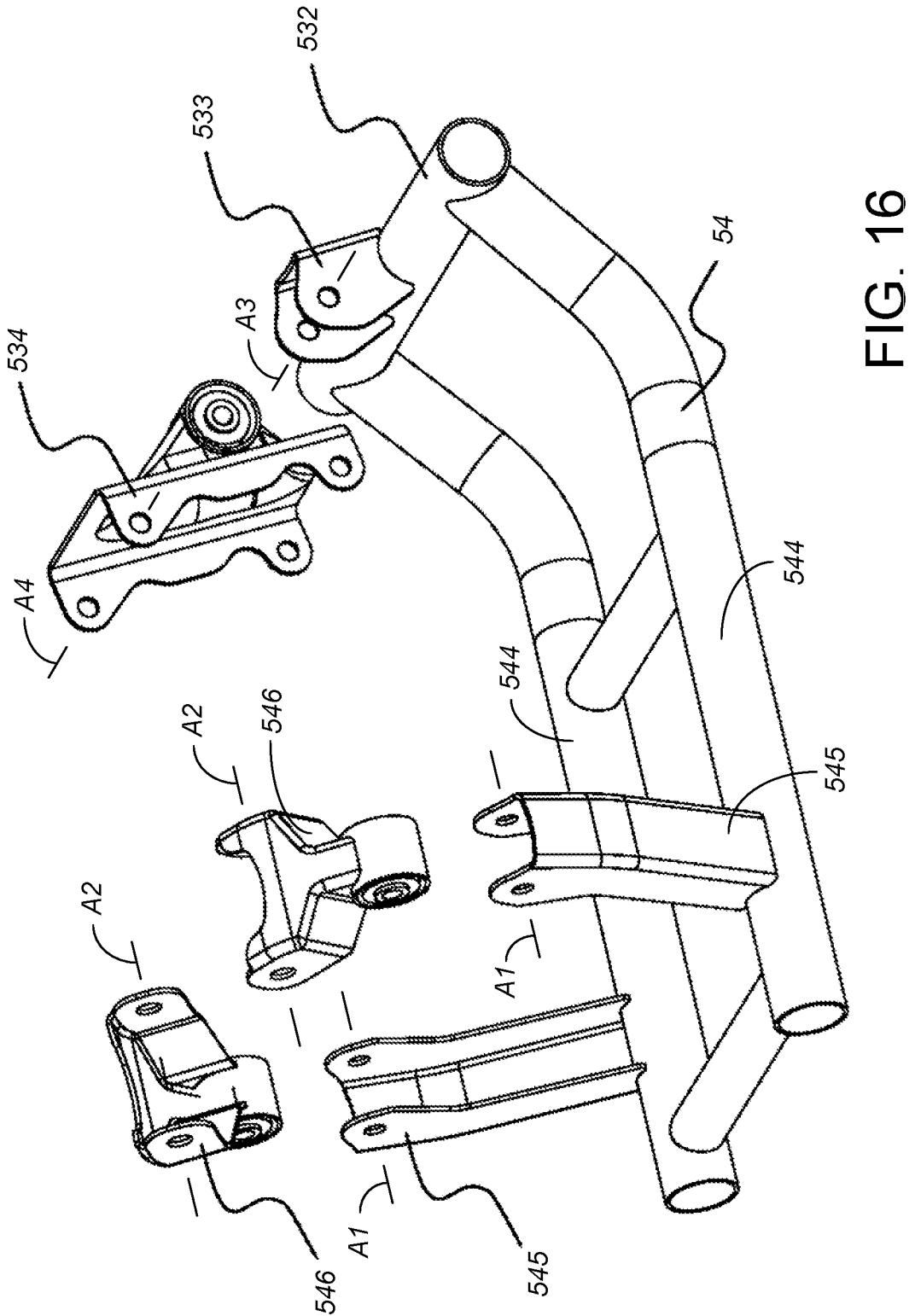
FIG. 16 is a perspective view of a double hinged connecting structure and portion of the rear frame assembly used in FIG. 15.

FIGS. 15 and 16 show a third embodiment of a frame structure 50. This embodiment has essentially the identical front frame assembly 51, base rails 543 and base plates 571 as in the second embodiment of FIGS. 5-10, but has a different structure at the bottom of the rear frame assembly 52. Specifically, the bottom of the rear frame assembly 52 includes two longitudinal base rails 544 and a rear crossbar 532. The longitudinal base rails 544 each include a side mounting bracket 545 extending upwardly and welded or otherwise rigidly secured to the longitudinal base rail 544. Trailing ends of the longitudinal base rails 544 curve upwardly to raise the elevation of the rear crossbar 532 above the elevation of the rest of the length of the longitudinal base rails 544. The rear crossbar 532 includes a rear mounting bracket 533 extending upwardly and welded or otherwise rigidly secured to the rear crossbar 532.

Each of the side mounting brackets 545 and the rear mounting bracket 533 provide a fixing point for the integration module 70, essentially in a triangle around the integration module 70. Like three legs of a stool, the use of three attachment points avoids the possibility of wobbling or gapping between the attachment points of the integration module 70 and the frame 50. Instead of providing for simple bolt or welded attachment, the preferred embodiment includes at least one, and more preferably three hinge connections for attaching the integration module 70 to the rear frame assembly 52. Further, at least one of these hinge connections, and preferably all three of these hinge connections, are double hinge connections, at least during assembly of the off-road vehicle 100.

As best shown in FIG. 16, a double hinge link 546 is hingedly attached to the side mounting brackets 545 such as with a bolt (not shown in FIG. 16) which establishes a fixed pivot axis A1. Each of the fixed pivot axes A1 preferably extend longitudinally, parallel to the longitudinal direction of the associated longitudinal base rail 544. The double hinge link 546 is hingedly attached to the integration module 70 such as with a bolt (not shown in FIG. 16) through a side attachment ear 71 which establishes a moving pivot axis A2. In each double hinge link 546, the moving pivot axis A2 is parallel to the fixed pivot axis A1, i.e., extends in the longitudinal direction. The side mounting brackets 545 each have a limited degree of transverse flexibility. Once assembled between the side mounting brackets 545 and the integration module 70, each double hinge link 546 extends substantially horizontally. During assembly of the off-road vehicle 100, the integration module 70 is secured to the rear frame assembly 50 using the double hinge links 546. However, it will be understood that (at this point during assembly) the double hinge links 546 allow the integration module 70 to be raised or lowered to a limited extent relative to the longitudinal base rails 544, with the double hinge links 546 pivoting and with only slight transverse flexing of the side mounting brackets 545. The ability to slightly raise and/or lower the integration module 70 helps in assembling all of the components, such as in positioning and securing the drive shaft 44 between the front and rear drive shaft offset mechanisms 431, 432. Moreover, the double hinge links 546 permit flexing of the frame 50 during rigorous riding of the off-road vehicle over obstacles, jumps and impacts without transferring as much stress to the integration module 70.

A rear double hinge link 534 is hingedly attached to the rear mounting bracket 533 such as with a bolt (not shown in FIG. 16) which establishes a fixed pivot axis A3, which preferably extends transverse, parallel to the rear crossbar 532. During assembly of the off-road vehicle, the rear double hinge link 534 is hingedly attached to the integration module 70 such as with a single bolt (not shown in FIG. 16) through a rear attachment ear 72 which establishes a moving pivot axis A4. The moving pivot axis A4 is parallel to the fixed pivot axis A3, i.e., extends in the transverse direction. The rear mounting bracket 533 has a limited degree of longitudinal flexibility. Thus, at this point in the assembly when the rear double hinge link 534 is attached to the integration module 70 with only a single bolt, the rear double hinge link 534 operates substantially identically as the double hinge links 546, permitting a limited degree of raising and/or lowering of the integration module 70 relative to the rear frame assembly 52. Only after the vehicle 100 is substantially more assembled, including having the entire drive shaft structure 43 with the integration module 70 and front and rear drive axle assemblies 411, 412 in place relative to the frame 50, is the second bolt added between the integration module 70 and the rear double hinge link 534. After the second bolt is added, the rear double hinge link 534 ceases acting as a double hinge, essentially fixing the location of the integration module 70 relative to the frame 50. After the second bolt is added, all three double hinge links 546, 534 continue to act as single hinges permit flexing of the frame 50 during rigorous riding of the off-road vehicle over obstacles, jumps and impacts without transferring as much stress to the integration module 70.

While the preferred embodiment uses three double hinge links 546, 534 all active during assembly of the off-road vehicle 100, with only one of these double hinge links 534 transformed into a single hinge connection through the addition of the second bolt, other embodiments use different numbers of connections. For instance, the side double hinge links 546 could include a second bolt, either for the connection to the integration module 70 or for the connection to the side mounting bracket 545, with that second bolt added after substantial assembly of the drive shaft structure 43 with the integration module 70 and front and rear drive axle assemblies 411, 412 relative to the frame 50. The rear double hinge link 534 could then be entirely omitted. Alternatively, more than three double hinge links could be used.

The rear attachment ear 72, providing bolt holes for both the pivot pin bolt and the second bolt, may be arranged on the electric motor 31, the rear differential 4121, or the control assembly 32 (if present) in the integration module 70. Which of the two forward bolt holes on the rear double hinge link 534 acts as the active double hinge axis A4 is not significant. By using bolts through the rear attachment ear 72, disassembly of the integration module 70 from the rear double hinge link 534 is easy.

Figure 17:
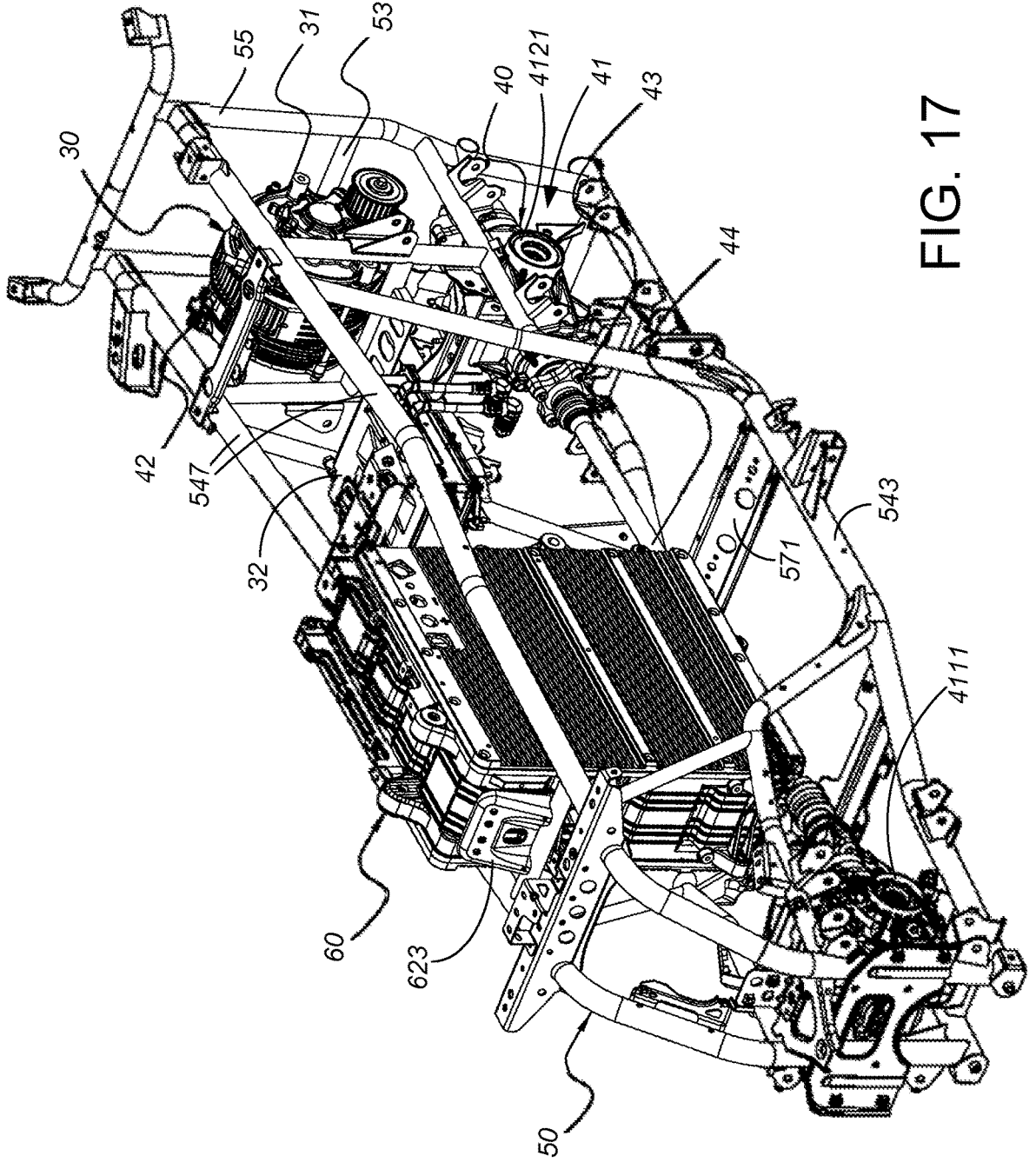
FIG. 17 is a front perspective view an of an alternative frame assembly, battery pack, motor, control assembly and drive train for an off-road vehicle such as shown in FIG. 1.

FIG. 17 shows an alternative but similar embodiment that omits the rearward and forward drive shaft offset mechanisms 431, 432. The drive shaft 44 is connected in line between the front differential 4111 and the rear differential 4121 and transmits torque from the rear differential 4121 to the front differential 4111. The electric motor 31 is mounted so its output shaft rotates about a transverse axis, with the gearbox 42 mounted on the side of the electric motor 31. The gearbox 42 transmits torque from the electric motor 31 to the rear differential 4121, with the rear differential providing torque not only to the rear wheels 11 but also to the front drive shaft assembly 43. In this embodiment with a transversely mounted motor 31, the control assembly 32 is mounted at a different location away from the motor 31, such as immediately behind the battery pack 60. In this embodiment without the drive shaft offset mechanisms 431, 432, the battery pack 60 must be further raised relative to the frame assembly 50.

In one alternative embodiment, the bottom of the battery pack 60 defines an inverted U-shaped groove, with the front drive shaft 44 at least partially arranged therein, and with the front drive shaft 44 extending above the base plates 571. In another alternative embodiment, the battery pack 60 is divided into two halves respectively placed on each side of the drive shaft 44, which also lowers the mounting position and the center of gravity P of the battery pack 60. However, these mounting methods will damage the performance and strength of the battery pack 60. Therefore, the use of the two drive shaft offset mechanisms 431, 432 are preferred to define a larger and lower accommodation space for mounting the battery pack 60.

FIG. 17 also shows a fourth embodiment for the frame structure 50. Instead of having front top bars and rear top bars extending longitudinally, the frame structure 50 has two unified top bars 547 which extend along right and left sides toward the top of the battery pack 60. The battery case 62 includes hangers 623 which support part or all of the weight of the battery pack 60 from the unified top bars 547. If the hangers 623 do not support all of the weight of the battery pack 60, then the base plates 571 are preferable modified to include openings through which the drive shaft 44 passes.

Figure 18:
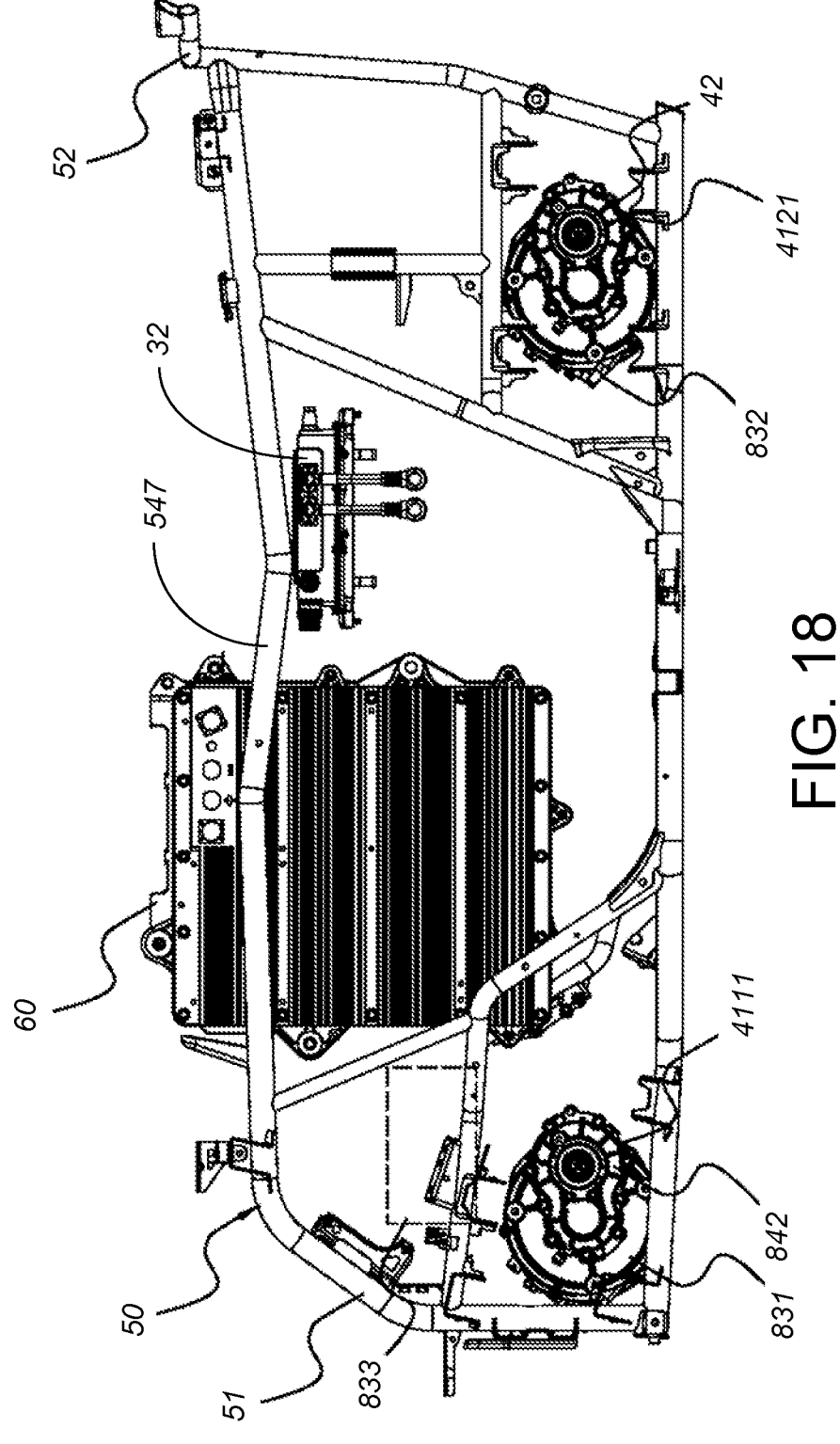
FIG. 18 is a side view of the frame assembly of FIG. 17 with an alternative drive structure equipped with dual electric motors.

FIG. 18 shows a side view of the fourth embodiment of a frame structure 50 for an electric off-road vehicle such as shown in FIG. 1 (i.e., a side view of the frame structure 50 shown in FIG. 17), using an alternative drive structure with dual electric motors including a front electric motor 831 and a rear electric motor 832.

The front electric motor 831 is arranged on the front frame assembly 51 and drives the front wheels 11 through a front gearbox 842 and a front differential 4111. The rear electric motor 832 is arranged on the rear frame assembly 52 and drives the rear wheels 12 through a rear gearbox 42 and a rear differential 4121. In the preferred dual electric motor embodiment, a single control assembly 32 controls both the torque outputs of the two drive motors 831, 832 and controls both gearboxes 842, 42. The control assembly 32 is preferably not positioned atop either electric motor 831, 832, but instead is hung from the unified top bars 547, preferably immediately behind the battery pack 60. Alternatively, the control assembly 32 may only control the rear drive motor 832 and the rear gearbox 42, and a front control assembly (not shown) may be used to control the front drive motor 831 and the front gearbox 842, such as positioned in the area 833. In the preferred dual electric motor embodiment, a single battery pack 60 is used to provide electricity to both electric motors 831, 832. The use of dual electric motors 831, 832 allows the vehicle to be configured without a drive shaft, leaving more space for arranging other components, driver, and passengers. The use of dual electric motors 831,

832 also allows for a more failsafe operation, as the vehicle can be powered (albeit at less power and/or slower speed) by only one of the electric motors should the other electric motor (or the other gearbox, or the other differential) have problems or fail.

Figure 19:
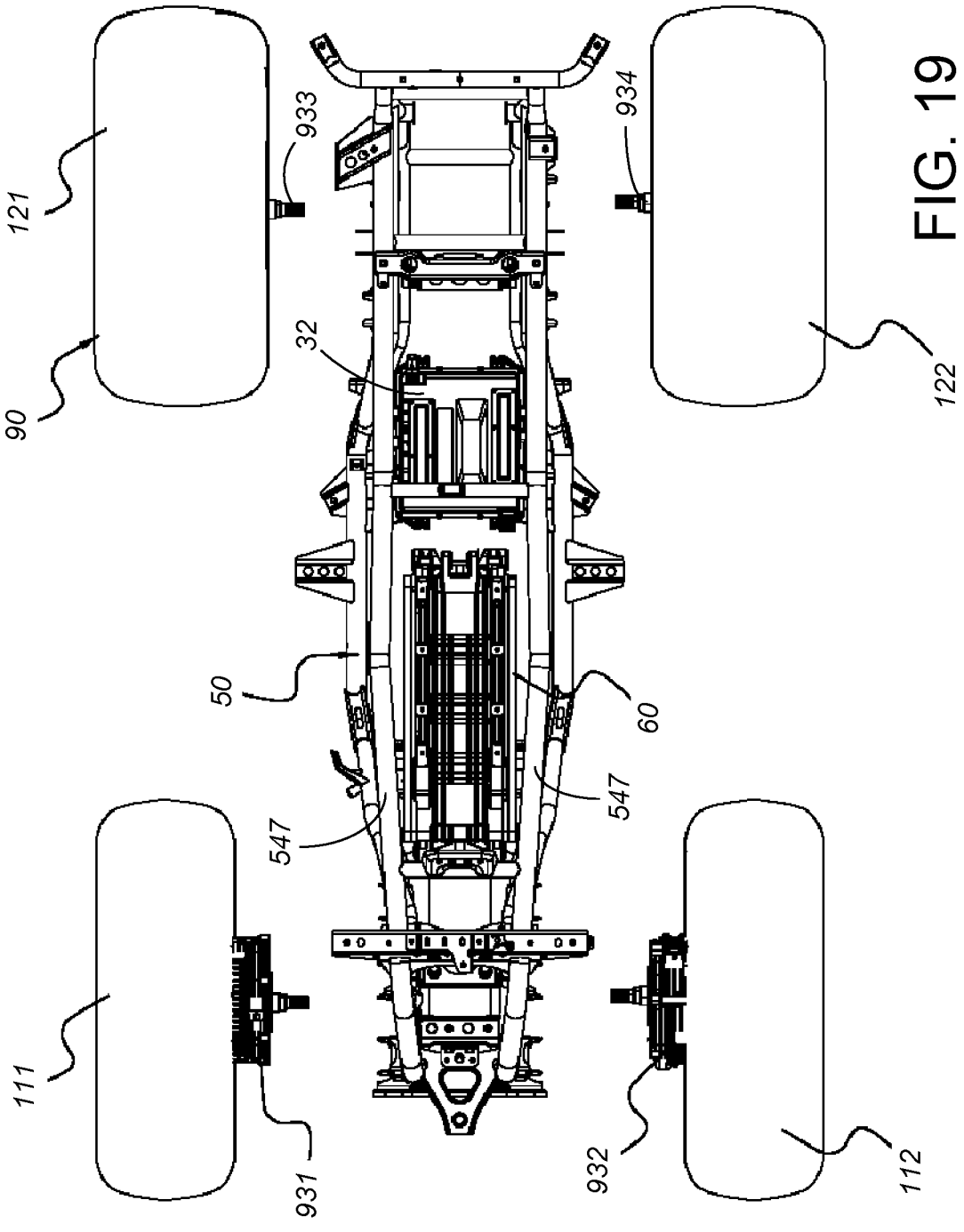
FIG. 19 is a top view of the frame assembly of FIGS. 17 and 18 with an alternative drive structure equipped with four electric motors.
Figure 20:
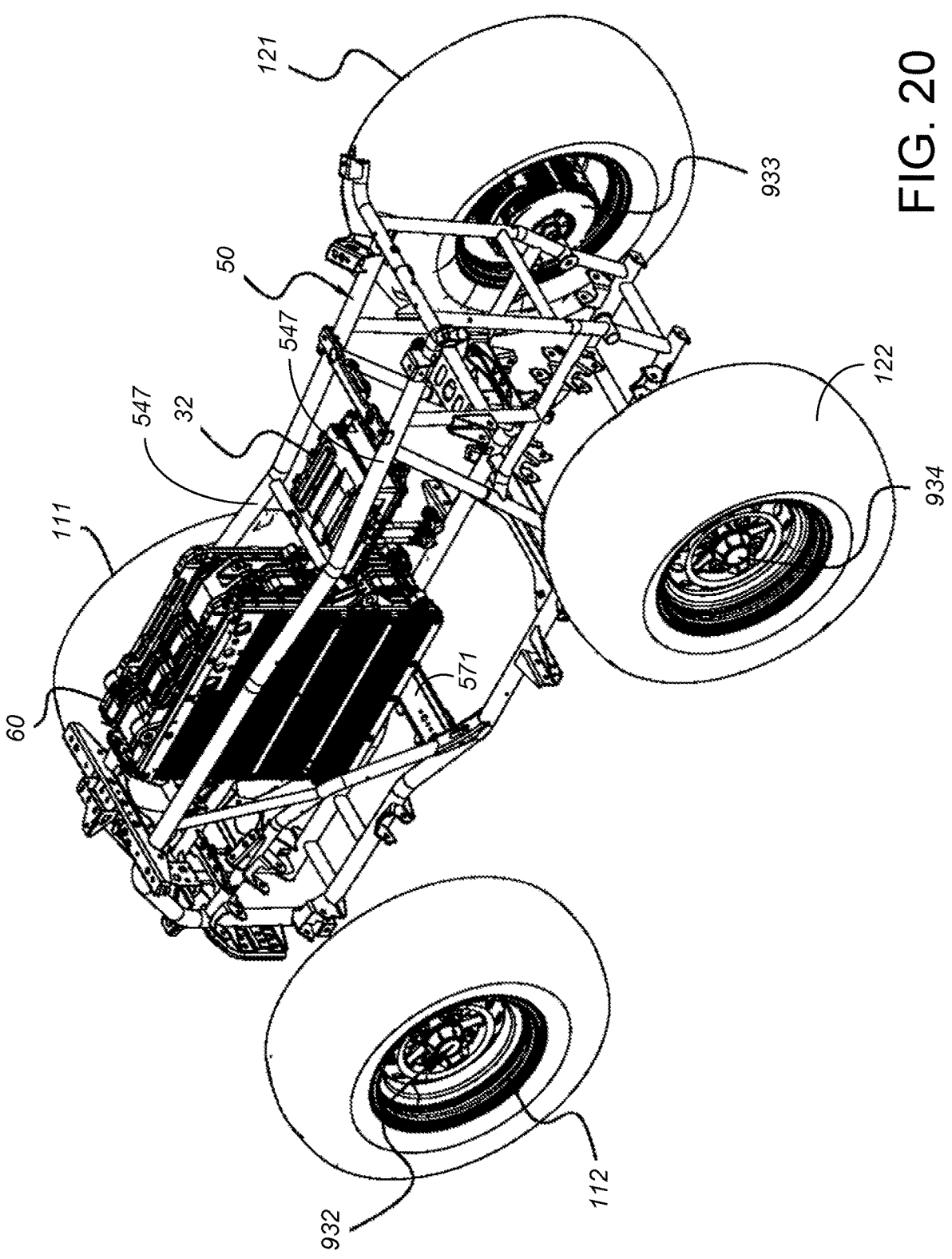
FIG. 20 is a rear perspective view of the drive and frame structure of FIG. 19.

FIGS. 19 and 20 show the same frame structure 50 of FIGS. 17 and 18, but using an alternative drive structure with quad electric motors including a front right drive motor 931, a front left drive motor 932, a rear right drive motor 933, and a rear left drive motor 934. In this embodiment, the rear wheels/tires 12 are wider than the front wheels/tires 11, so less of the rear drive motors 933, 934 can be seen in FIG. 19.

Each drive motor 931-934 is arranged on the inside of the hub of the respective wheels 111, 112, 121, 122. Each drive motor 931-934 includes its own gearbox (not separately shown), but no differentials and no drive shaft are needed. In the preferred quad electric motor embodiment, a single control assembly 32 controls the torque outputs of all four drive motors 931-934 and controls all four gearboxes. Alternative, two or four control assemblies could be used. In the preferred quad electric motor embodiment, a single battery pack 60 is used to provide electricity to all four electric motors 931-934.

The above-mentioned embodiments only represent several embodiments of the present invention, and the descriptions thereof are specific and detailed, but should not be construed as a limitation on the scope of the invention. Workers of ordinary skill in the art may make numerous modifications and improvements without departing from the concepts of the present invention. Therefore, the protection scope of the patent of the present invention is defined to include the full breadth of the appended claims.

What it is claimed is:

1. An electric off-road vehicle comprising:
a prime mover assembly comprising at least a first electric motor;
a plurality of wheels comprising front wheels and rear wheels;
a frame assembly on which the first electric motor is arranged;
a battery pack providing electric energy for the first electric motor; and
a vehicle cover at least partially arranged on the frame assembly;
wherein the frame assembly comprises a front frame assembly and a rear frame assembly,
the front frame assembly and the rear frame assembly are both provided with connection brackets above a midheight of the front and rear frame assemblies, the battery pack is connected to the front frame assembly and the rear frame assembly as an entirety by the connection brackets so as to be able to transmit loads above the midheight of the front and rear frame assemblies between the front frame assembly and the rear frame assembly through the connection brackets and battery pack, and with no frame structure above the midheight of the front and rear frame assemblies extending past the battery pack to connect the front frame assembly to the rear frame assembly.

2. The electric off-road vehicle of claim 1, further comprising:
a drive train comprising:
a front drive axle assembly;
a rear drive axle assembly; and
a drive shaft connected between the electric motor and at least one of the front and rear drive axle assemblies, the electric motor being capable of transmitting torque to the front and rear drive axle assemblies including transmitting torque through the drive shaft, and the drive shaft being positioned below the battery pack.

3. The electric off-road vehicle of claim 2, wherein the drive train further comprises a gearbox having a gearbox output gear, and the drive shaft is provided with a drive shaft input gear meshed with the gearbox output gear.

4. The electric off-road vehicle of claim 2, wherein the drive shaft, is part of a drive shaft assembly, a front end of the drive shaft assembly is provided with a front bevel gear meshed with the front drive axle assembly, and a rear end of the drive shaft assembly is provided with a rear bevel gear meshed with the rear drive axle assembly.

5. The electric off-road vehicle of claim 4, wherein the front drive axle assembly comprises a front differential having a front differential input bevel gear meshed with the front bevel gear of the drive shaft, and wherein the rear drive axle assembly comprises a rear differential having a rear differential input bevel gear meshed with the rear bevel gear of the drive shaft.

6. The electric off-road vehicle of claim 4, further comprising at least one seat, wherein the battery pack is arranged at least partially under the seat and between the front drive axle assembly and the rear drive axle assembly.

7. The electric off-road vehicle of claim 4, wherein the battery pack is arranged in front of the prime mover assembly.

8. The electric off-road vehicle of claim 4, wherein the electric off-road vehicle further comprises a transfer case connected between the front drive axle and the electric motor for controlling the connection and disconnection between the front drive axle and the electric motor.

9. The electric off-road vehicle of claim 2, wherein the bottom of the battery pack defines an inverted U-shaped groove extending longitudinally, and wherein the drive shaft is at least partially arranged within the inverted U-shaped groove.

10. The electric off-road vehicle of claim 1, further comprising:
a drive train comprising a drive shaft and a rear drive axle assembly transmitting torque from the prime mover assembly to the plurality of wheels;
wherein the drive shaft defines a drive shaft axis and the rear drive axle assembly receives torque about a rear drive axle assembly input axis, with the drive shaft axis being offset relative to the rear drive axle assembly input axis, and wherein the drive shaft is at least partially arranged below the battery pack.

11. The electric off-road vehicle of claim 10, wherein the drive train further comprises a front drive axle assembly driven by the drive shaft so as to drive the front wheels.

12. The electric off-road vehicle of claim 11, wherein the front drive axle assembly is gear meshed to the drive shaft, so as to deliver torque from the drive shaft to the front drive axle assembly.

13. The electric off-road vehicle of claim 11, wherein the front drive axle assembly receives torque about a front drive axle assembly input axis, with the drive shaft axis being offset relative to the front drive axle assembly input axis.

14. The electric off-road vehicle of claim 10, wherein the bottom of the battery pack defines an inverted U-shaped groove, the drive shaft being at least partially arranged in the inverted U-shaped groove.

15. The electric off-road vehicle of claim 1, wherein an accommodation space is defined between the front frame assembly and the rear frame assembly, and the battery pack is at least partially arranged within the accommodation space.

16. The electric off-road vehicle of claim 1, wherein the battery pack comprises a battery case and a plurality of batteries closely arranged inside the battery case, and the battery case is connected to the connection brackets.

17. The electric off-road vehicle of claim 1, further comprising a front drive axle assembly and a rear drive axle assembly, with the first electric motor arranged on the front frame assembly for driving the front drive axle assembly, and further comprising a second electric motor arranged on the rear frame assembly for driving the rear drive axle assembly.

18. The electric off-road vehicle of claim 17, wherein the electric off-road vehicle further comprises a first control assembly at least arranged above at least one of the first drive motor and the second drive motor.

19. The electric off-road vehicle of claim 17, wherein the electric off-road vehicle further comprises a second control assembly.

20. The electric off-road vehicle of claim 17, wherein the battery pack is positioned between the front drive axle assembly and the rear drive axle assembly.

\* \* \* \* \*